United States Patent
Stepanov et al.

(10) Patent No.: US 11,697,378 B2
(45) Date of Patent: Jul. 11, 2023

(54) CLAMPING MOUNT FOR VEHICLE DASHBOARD

(71) Applicant: Cypress Overland LLC, San Francisco, CA (US)

(72) Inventors: Dmitri Stepanov, San Francisco, CA (US); Aliaksandra Birukova, San Francisco, CA (US); Matthew Campbell Greaves, Oxley (AU)

(73) Assignee: Cypress Overland LLC, San Francisco, CA (US)

( * ) Notice: Subject to any disclaimer, the term of this patent is extended or adjusted under 35 U.S.C. 154(b) by 0 days.

(21) Appl. No.: 17/390,461

(22) Filed: Jul. 30, 2021

(65) Prior Publication Data
US 2023/0030486 A1    Feb. 2, 2023

(51) Int. Cl.
*B60R 11/02* (2006.01)
*B60R 11/00* (2006.01)

(52) U.S. Cl.
CPC ....... *B60R 11/02* (2013.01); *B60R 2011/0008* (2013.01); *B60R 2011/0059* (2013.01)

(58) Field of Classification Search
CPC ..... B60R 2011/0008; B60R 2011/0059; B60R 11/02; B60R 11/00; B60R 2011/0005; F16B 13/04; F16B 13/10; F16B 13/0833; F16B 2/12; B60H 3/0028; F16J 15/00; F16J 15/0887
USPC .............................. 248/231.9, 309.1, 231.61
See application file for complete search history.

(56) References Cited

U.S. PATENT DOCUMENTS

| | | | |
|---|---|---|---|
| 3,944,178 A * | 3/1976 | Greenwood | F16M 11/08 248/214 |
| 4,846,382 A | 7/1989 | Foultner | |
| 5,187,744 A | 2/1993 | Richter | |
| 5,193,768 A * | 3/1993 | Mita | B60R 11/0211 70/57 |
| 5,555,302 A | 9/1996 | Wang | |
| 5,576,687 A | 11/1996 | Blank | |
| 5,790,661 A | 8/1998 | Patterson | |
| 6,932,309 B1 | 8/2005 | Corey | |
| 7,403,613 B2 | 7/2008 | Liou | |

(Continued)

FOREIGN PATENT DOCUMENTS

EP    2209289    7/2010

OTHER PUBLICATIONS

Offroam, Air Vent AMPS Mount Base—Jeep Wrangler JL / Gladiator, https://getoffroam.com/collections/jeep-products/products/jeep-wrangler-jl-gladiator-offroam-clamp-amps-mount (2021).

*Primary Examiner* — Ingrid M Weinhold
(74) *Attorney, Agent, or Firm* — Fitch, Even, Tabin & Flannery LLP

(57) ABSTRACT

A removable mounting device configured for mounting accessories to an air vent in a vehicle and methods for installing such a mounting device. The mounting device includes a coupler disposed on a front plate that has a profile sized such that the front plate will overlay a frame surrounding an air vent in the vehicle; and a back plate configured to clamp the frame to the front plate. An elastomeric compression strip is disposed in a groove in a back side of the front plate, and the elastomeric compression strip has a non-uniform thickness including a thicker portion in a region of the groove adjacent to an end of the groove and thinner portions in regions of the groove not adjacent to the end of the groove.

20 Claims, 23 Drawing Sheets

(56) References Cited

U.S. PATENT DOCUMENTS

| | | | |
|---|---|---|---|
| 8,061,670 B1 | 11/2011 | White | |
| 8,201,800 B2 | 6/2012 | Filipiak | |
| 8,481,916 B2 | 7/2013 | Heslin | |
| 8,770,539 B1 | 7/2014 | Hsu | |
| 8,857,687 B1 | 10/2014 | An | |
| 9,081,256 B2 | 7/2015 | Dering | |
| 9,283,898 B2 | 3/2016 | Azadi | |
| 9,452,714 B2 * | 9/2016 | Emslie | B60R 7/06 |
| 9,475,531 B2 | 10/2016 | Rawlings | |
| 9,701,256 B2 | 7/2017 | Haymond | |
| 10,155,482 B2 | 12/2018 | Corso | |
| 10,315,585 B2 | 6/2019 | Minn | |
| 10,351,037 B2 * | 7/2019 | Cancado | B60N 3/102 |
| 10,363,882 B2 * | 7/2019 | Miyazaki | B60R 11/00 |
| 10,605,287 B2 * | 3/2020 | DeCosta | F16B 13/0808 |
| 2009/0108152 A1 | 4/2009 | Carnevali | |
| 2016/0347257 A1 | 12/2016 | Buchanan | |
| 2018/0043840 A1 | 2/2018 | Minn | |

* cited by examiner

CLAMPING MOUNT FOR VEHICLE DASHBOARD

FIELD

This disclosure relates to systems for mounting items within a vehicle and, in particular, to mounts for electronic devices used in automobiles.

BACKGROUND

Vehicle drivers of all types have become accustomed to keeping electronic devices readily accessible within their vehicles. These electronic devices may include navigation units, displays for back-up cameras, stereo equipment, dashboard cameras, cellular phones, and pocket computing devices such as smartphones that perform many or all of these functions. Many mounting systems are now available to mount such electronic devices to the interior of cars, trucks, and other such vehicles. Such mounting systems are commonly designed to be mounted in nearly any vehicle, by mounting the electronic device to the vehicle windshield, within a cupholder, or clipping to some portion of the dashboard or other interior surface. Such "universal" mounting systems serve adequately for many drivers, who engage in ordinary driving activities such as commuting to and from work, shopping, visiting friends and relatives, or shuttling children from place to place on paved roadways.

Drivers in more extreme conditions, however, are not well-served by the existing universal mounting devices. For example, off-road travel causes vibration and impacts that tend to shake loose known mounting systems. First responders, such as fire fighters, emergency medical services, and law enforcement officers similarly require mounts that securely hold electronic devices, such as during high-G maneuvers.

Rigid, semi-permanent mounts are desirable in such extreme conditions, but such mounts often require fasteners that damage the dashboard of vehicles in which they are installed. Known solutions include using adhesives (glue or tape) or using threaded fasteners to attach a mounting point to the vehicle dashboard or other interior surface. In some cases, the vehicle dashboard must be disassembled to access a hard mounting point on which to attach the semi-permanent mount. These approaches are problematic, however because installing or removing the mount may damage the vehicle. For example, glued mounting points are not readily removed because they tend to leave glue behind or may tear portions of the vehicle dashboard or interior. Threaded fasteners require pre-drilling holes, either as a pilot for a self-tapping screw or as a through-hole to be used with a machine screw and nut. When a mount secured with a threaded fastener is removed, it leaves behind screw-holes that are unsightly and reduce the value of the vehicle. These approaches may also require significant effort, which is also true if the dashboard must be disassembled once again to remove the mount. Many vehicle owners and users are therefore reluctant to use such semi-permanent mounting systems.

BRIEF DESCRIPTION OF THE DRAWINGS

FIGS. 30A-30C are cutaway side views of a portion of a groove and an elastomeric compression strip. FIG. 30D is a top view of a portion of a groove and an elastomeric compression strip.

DETAILED DESCRIPTION

Figure 1:
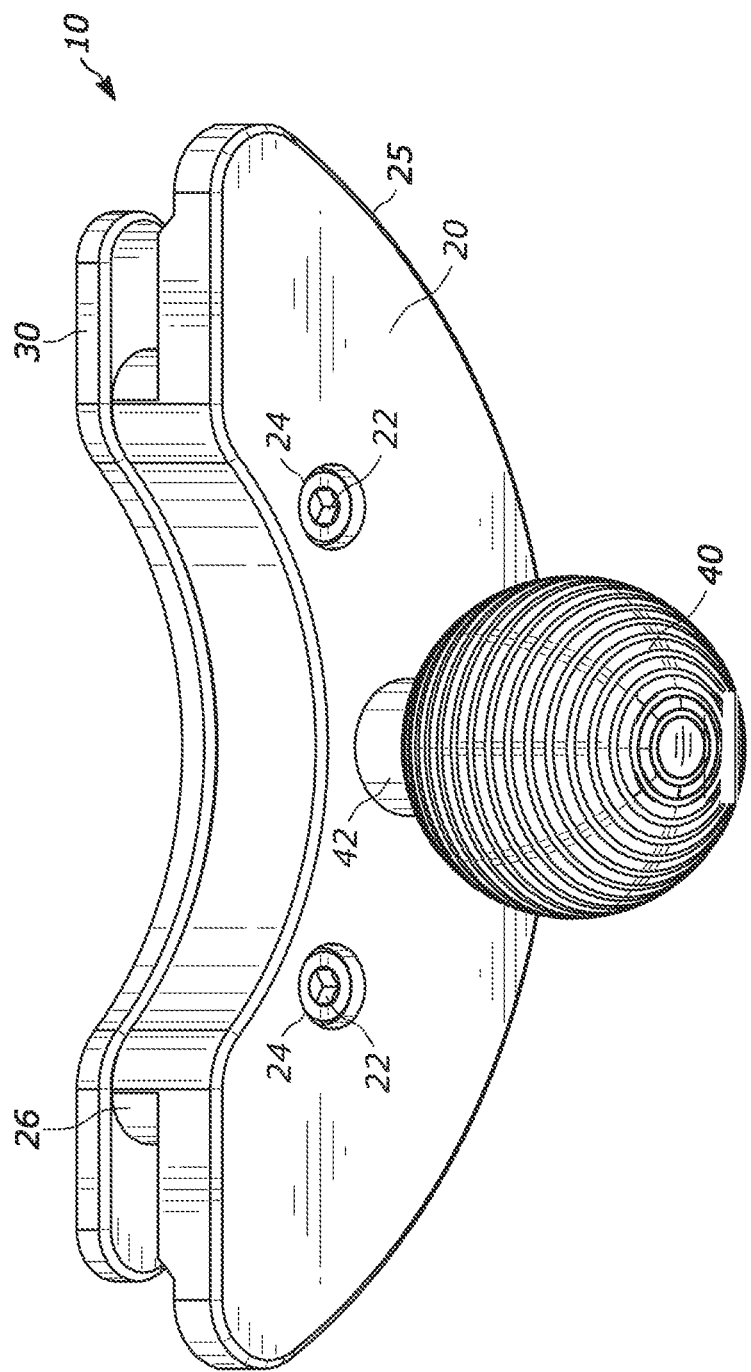
FIG. 1 is a top perspective view of a dashboard mounting device according to a first example of the disclosed invention.
Figure 2:
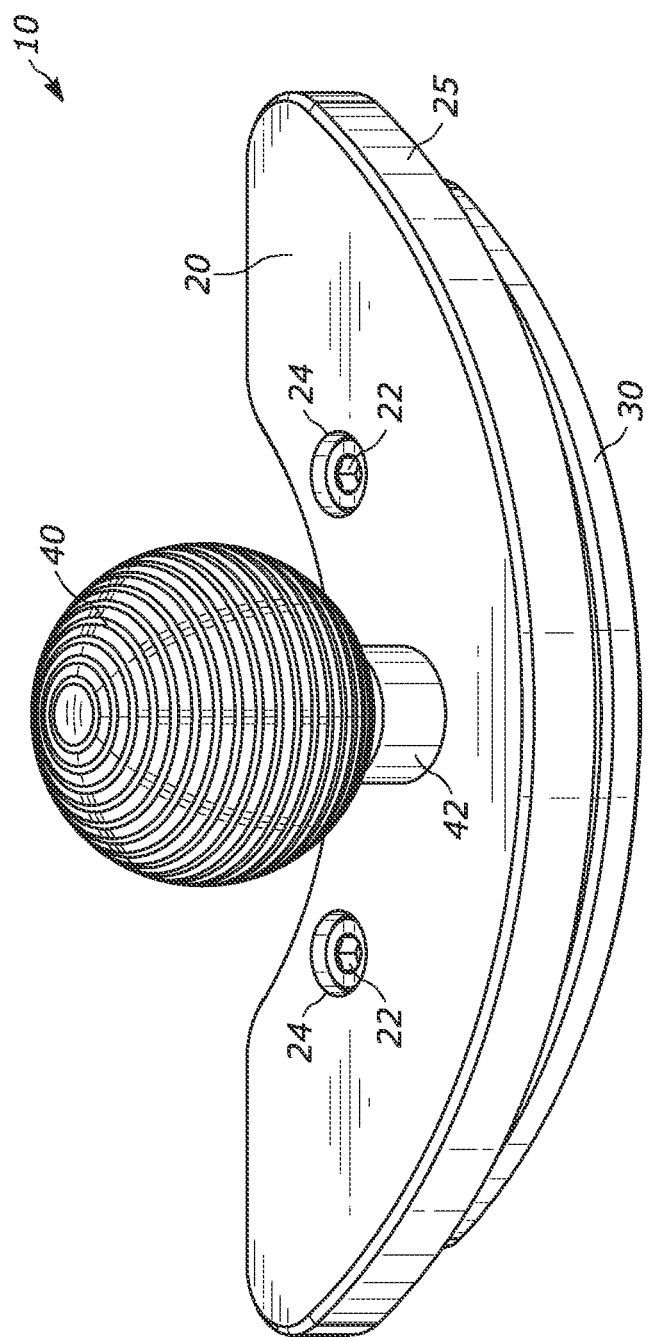
FIG. 2 is a bottom perspective view of the dashboard mounting device shown in FIG. 1.

A removable mounting device is provided for mounting accessories to an air vent in a vehicle. The mounting device includes a front plate having a profile sized such that the front plate will overlay a frame surrounding the air vent in the vehicle, and a back plate removably fastened to the front plate. The back plate is configured to clamp the frame to the front plate. In addition, the back plate has a profile that allows motion of louvers within the air vent. A spacing flange is between the front plate and the back plate. A coupler is affixed to the front plate for mounting the accessories. A groove is formed in a back side of the front plate, configured to substantially match a profile of the frame. An elastomeric compression strip is installed in the groove. The elastomeric compression strip has a non-uniform stiffness including a first stiffness in a region of the groove not adjacent to an end of the groove and a second stiffness greater than the first stiffness in a region of the groove adjacent to the end of the groove.

In some examples, the elastomeric compression strip has an uncompressed length greater than a length of the groove. This creates a greater thickness of the elastomeric compression strip in regions near ends of the groove.

In some examples, the mounting device further includes a threaded fastener securing the coupler to the front plate. The coupler may further include a substantially spherical portion, a shaft extending from the spherical portion, a knurled portion at a distal end of the shaft, a shoulder portion on the shaft adjacent to the knurled portion, and a threaded hole in the distal end of the shaft receiving the threaded fastener. The front plate may further include a pocket disposed on a front side of the front plate for receiving the knurled portion of the coupler at the distal end of the shaft.

In some examples the removable mounting device may include a lip extending from a back side of the front plate and disposed along an edge of the front plate.

In some examples the removable mounting device may include at least two screws, and the back plate fastens to the front plate using at least two screws. In further examples, the at least two screws are disposed on a first axis that substantially bisects the back plate in a direction perpendicular to the first axis. The coupler is disposed on a second axis that substantially bisects the front plate in a direction perpendicular to the first axis, and the at least two screws and the coupler are symmetric with respect to the front plate in the direction perpendicular to the first axis.

In some examples the removable mounting device may include at least one channel between segments of the back plate, wherein the at least one channel is sized to permit a louvre to move when the mounting device is attached to the air vent.

In some examples the removable mounting device may include a plurality of threaded fasteners disposed in holes in the front plate and configured to removably fasten the back plate to the front plate with the frame clamped therebetween.

In some examples the spacing flange is integrated with and extending rearwardly from the front plate. In some examples the spacing flange is integrated with and extending forwardly from the back plate. In some examples the coupler is a standard ball coupler or a standard socket coupler.

A method is provided for mounting a removable mounting device on a frame of an air vent in a vehicle. The mounting device includes a front plate having a profile sized such that the front plate will overlay the frame, and a back plate configured to clamp the frame to the front plate. The method includes a step of loosening a plurality of threaded fasteners used to fasten the front plate to the back plate such that a gap between the front plate and the back plate is sufficient to receive the frame. The method also includes a step of placing the mounting device on the frame such that the frame is disposed between the front plate and the back plate. The method also includes a step of tightening the plurality of threaded fasteners such that the frame is clamped between the front plate and the back plate. In this step, a clamping force is developed by compressing an elastomeric compression strip installed in a groove formed in a back side of the front plate, wherein the groove is configured to substantially match a profile of the frame. The elastomeric compression strip has a non-uniform stiffness including a first stiffness in a region of the groove not adjacent to an end of the groove and a second stiffness greater than the first stiffness in a region of the groove adjacent to the end of the groove.

In some examples the method includes a step of orienting the frame of the air vent at a desired orientation before tightening the plurality of threaded fasteners.

The disclosed mounting devices can advantageously be customized to provide a rigid mounting solution for a variety of vehicles, with air vents having different shapes and sizes. Features of the examples provided herein can be modified to fit these different vehicles without departing from the scope of the disclosed invention. As discussed below, certain features of the disclosed devices are expected to be modified to make the mounting devices suitable for use in particular vehicles or with particular air vents. Compared to existing mounting devices, the disclosed devices provide a more rigid connection between the mounting device and the vehicle. The air vent frame is sometimes a large, rigid portion of a vehicle dashboard, making it a robust attachment point for securing electronic and other devices. Even in vehicles where the frame is merely a modular dashboard insert, the shape and attachment mechanisms of the frame provides rigidity needed to secure the air vents and consequently also provide a rigid attachment point for electronic devices. Mounting to the air vent frame advantageously allow the disclosed devices to be used in vehicles designed for off-road and extreme performance, which may subject the vehicle to high-G or jerking movements.

By customizing the device for a variety of vehicles, the disclosed invention advantageously simplifies installation of the device. Each mounting device disclosed herein is designed so that it can be installed without removing the back plate from the mounting device. The size, shape, and orientation of the back plate (e.g., 30) are all adjusted to simplify installation. The person installing the mounting device (e.g., 10) in their vehicle can simply slide the mounting device into place and they do not have to hold the back plate in position or risk losing screws while assembling the device. As would be recognized by a skilled designer, various mechanisms could also be used to fully capture the screws (e.g., 22), making it difficult or impossible to completely remove the screws from the back plate even when fully loosened.

Advantages of the disclosed invention further include providing a mounting system that is rigidly attached within the vehicle, but which can be easily removed and which will not damage the interior surfaces of the vehicle. First responders such as law enforcement officers, emergency medical services, or fire fighters, for example, may favor the disclosed device because it can be mounted within a publicly-owned vehicle by the individual, but subsequently removed without damaging the vehicle. This frees the individuals from ordinary channels of procurement, and allows first responders to mount personal devices within their vehicles in a secure manner.

First Embodiment

A first mounting device 10 is shown in FIGS. 1-9, designed for use with air vents that have a circular or arcuate frame. As shown, the preferred embodiment of the mounting device 10 includes a ball coupler 40 that a number of devices can mount to, including devices suitable for holding a variety of electronic devices, such as navigation units, displays for back-up cameras, stereo equipment, dashboard cameras, cellular phones, and pocket computing devices such as smartphones that perform many or all of these functions. The ball coupler 40 may include grooves (as shown in FIG. 1) or be coated with a non-slip material. The ball coupler 40 includes a neck 42. In alternate designs, the ball coupler 40 can be replaced by known ball or socket mounting interface, or a similar universal coupling device. Preferred mounting devices will include a standard mounting interface that can be used with corresponding off-the-shelf components.

The mounting device 10 includes a front plate 20, including an arcuate outer edge 25. The front plate includes holes 24 for receiving mounting screws 22. The holes 24 may be countersunk to receive the head of a socket head cap screw or other machine screw, as shown. The neck 42 of the ball coupler 40 is secured to the front plate 20.

The mounting device 10 also includes a spacing flange 26, which as shown is unitary or structurally integral with the front plate 20. In some examples the spacer may be a separate component with holes to receive the fasteners 22. The thickness of the spacing flange 26 depends on the specific shape and thickness of the frame to be clamped by the mounting device. With respect to the frame, the spacing flange is designed to be thin enough such that when the mounting device 10 is clamped onto the frame, the mounting device 10 will develop preload by compressing the elastomeric compression strip 28 enough that screws 22 are retained without the use of threadlocking compounds or specialty washers. The spacing flange is also designed to be thick enough to prevent over-compression of elastomeric compression strip 28, i.e., to prevent the mounting device 10 from "bottoming out" by fully compressing the elastomeric compression strip 28. The spacing flange may also be designed to be thick enough to prevent the mounting device 10 from clamping the frame of the air vent with a force that could damage (e.g., crack) the frame of the air vent.

Figure 4A:
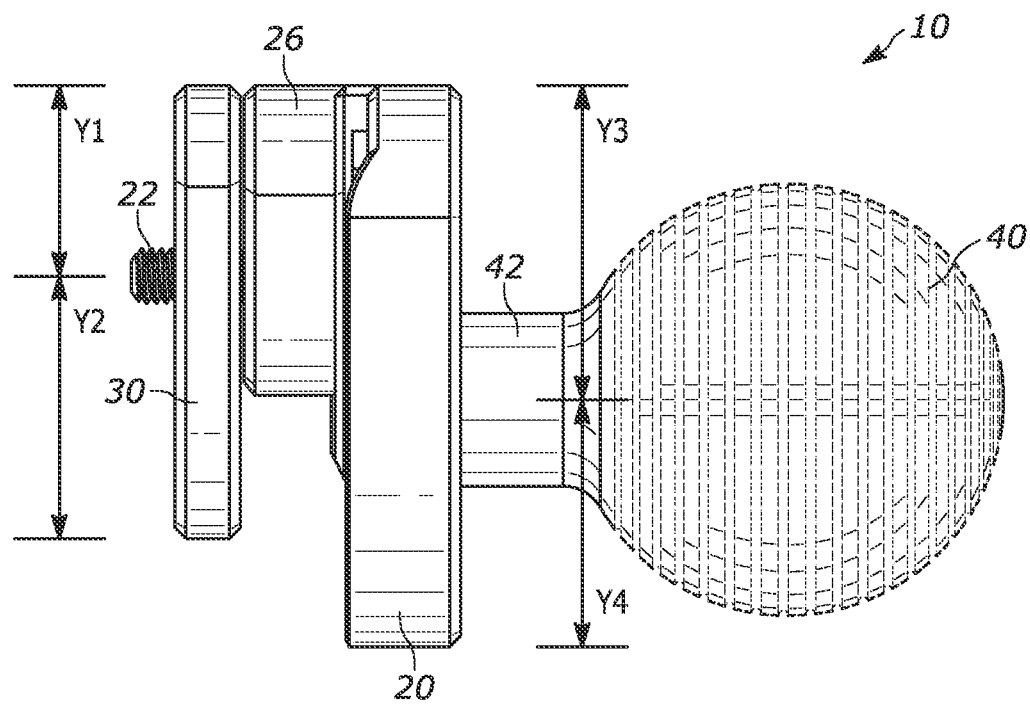
FIG. 4A is a left plan view of the dashboard mounting device shown in FIG. 1.
Figure 4B:
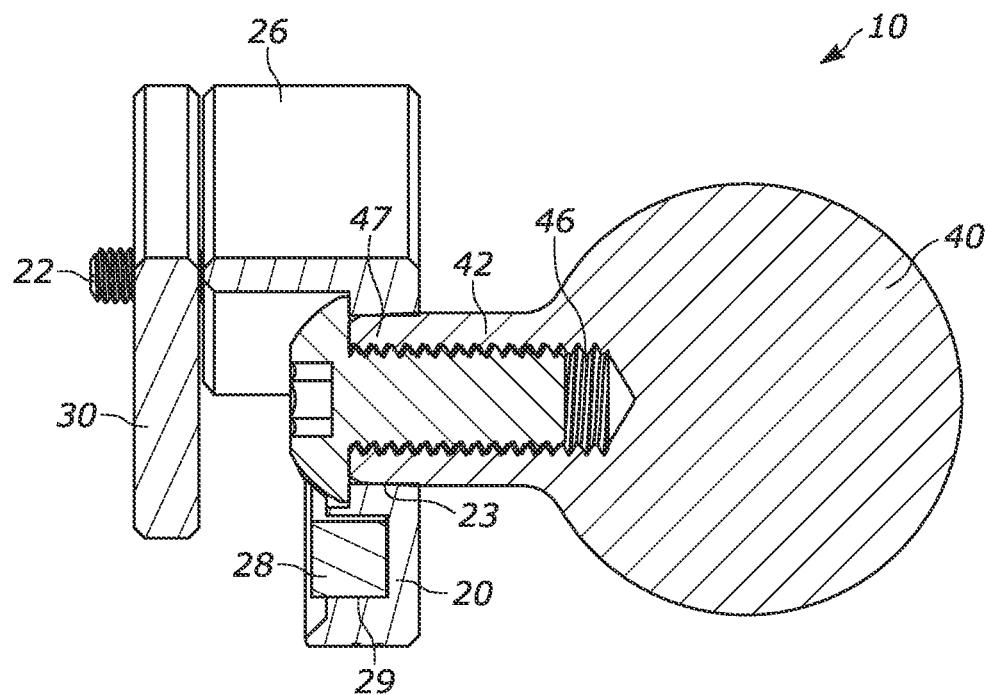
FIG. 4B is a cut-away view of the dashboard mounting device shown in FIG. 1.
Figure 5:
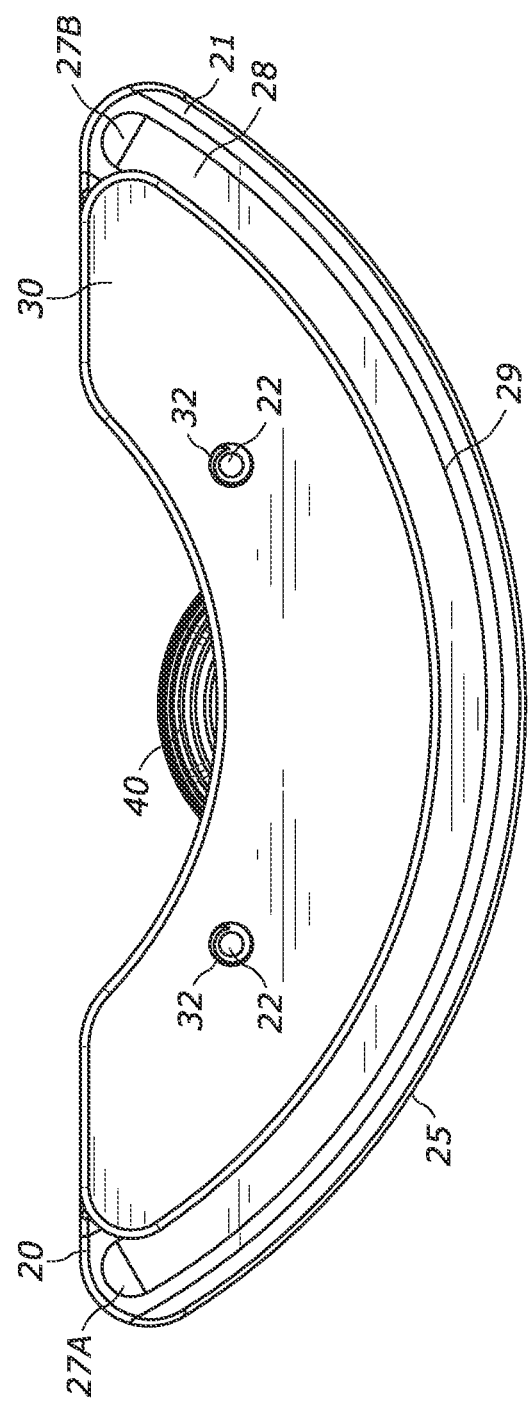
FIG. 5 is a rear elevation view of the dashboard mounting device shown in FIG. 1.

The mounting device 10 includes a back plate 30. With reference to FIG. 4, the fasteners 22 may extend into or through the back plate 30. With reference to FIG. 5, the back plate 30 may have holes 32. In the preferred embodiment, the holes 32 are threaded to receive the fasteners 22. Alternative embodiments include separate hardware such as a nut and washers, but this approach is less favored because it increases the overall thickness of the mounting device 10 and may interfere with louvers of an air vent when the mounting device 10 is installed on the air vent. In addition, separate nuts and washers are easily dropped during installation of the mounting device 10. The fasteners 22 serve to clamp the back plate 30 to the front plate 20.

Figure 3:
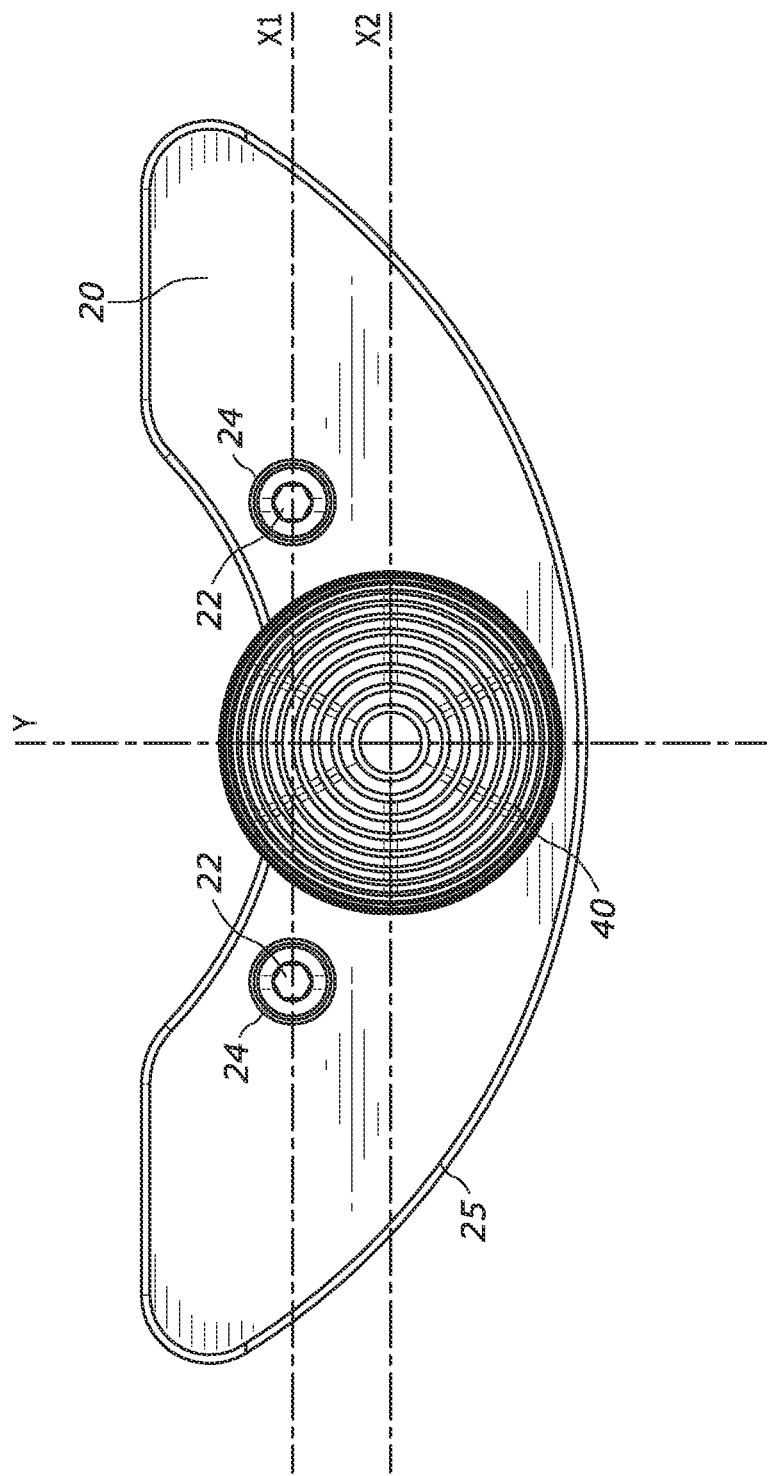
FIG. 3 is a front elevation view of the dashboard mounting device shown in FIG. 1.

The screws 22 and the ball coupler 40 are positioned on the mounting device 10 such that they substantially balance forces imposed on the frame when an electronic device is mounted on the coupler 40. As shown in FIG. 3, two screws 22 are disposed on an axis $X_1$ and the screws 22 are used to clamp the front plate 20 to the back plate 30. To achieve this balancing of forces, the screws 22 and the axis $X_1$ are placed where they substantially bisect the back plate 30, along the Y-axis perpendicular to the axis $X_1$, as illustrated by the distances $y_1$ and $y_2$ on FIG. 4, which are preferably selected such that the ratio $y_1/y_2$ is between 0.7 and 1.25. Locating the screws 22 according to these design principles effectively provides a uniform clamping force along in the Y-axis direction between the front plate 20 and the back plate 30.

To achieve the desired balancing of forces with respect to the ball coupler 40, the coupler is disposed on the axis $X_2$, placed where it substantially bisects the front plate 20 along the Y-axis, as illustrated by the distances $y_3$ and $y_4$ on FIG. 4. The distances $y_3$ and $y_4$ are preferably selected such that the ratio $y_3/y_4$ is between 1.5 and 1.75. Locating the coupler 40 according to these design principles effectively balances the reactive forces provided by the extreme ends of the front plate in the Y direction. The balanced forces maintain consistent clamping forces between the front plate 20 and the back plate 30 even when substantial load is placed on the coupler 40.

Figure 8:
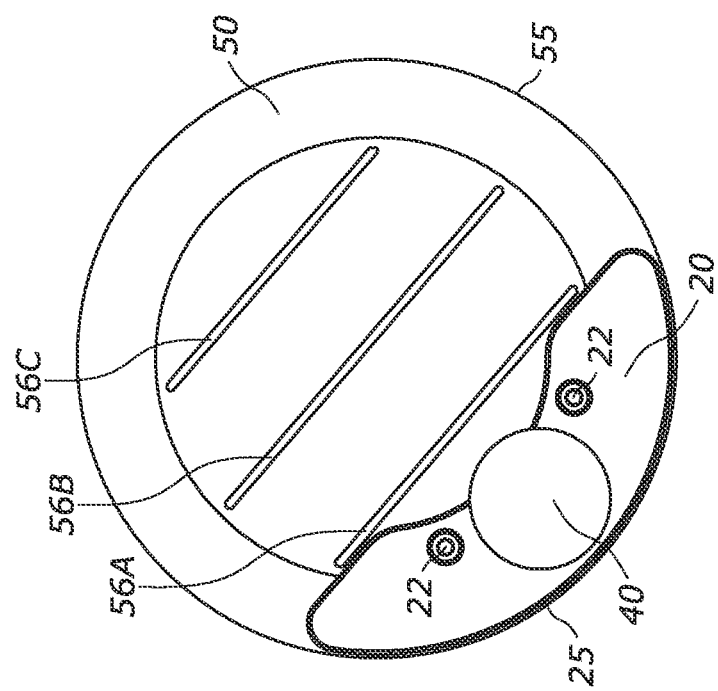
FIGS. 7 and 8 are front elevation views of the dashboard mounting device shown in FIG. 1 in the context of an air vent.
Figure 7:
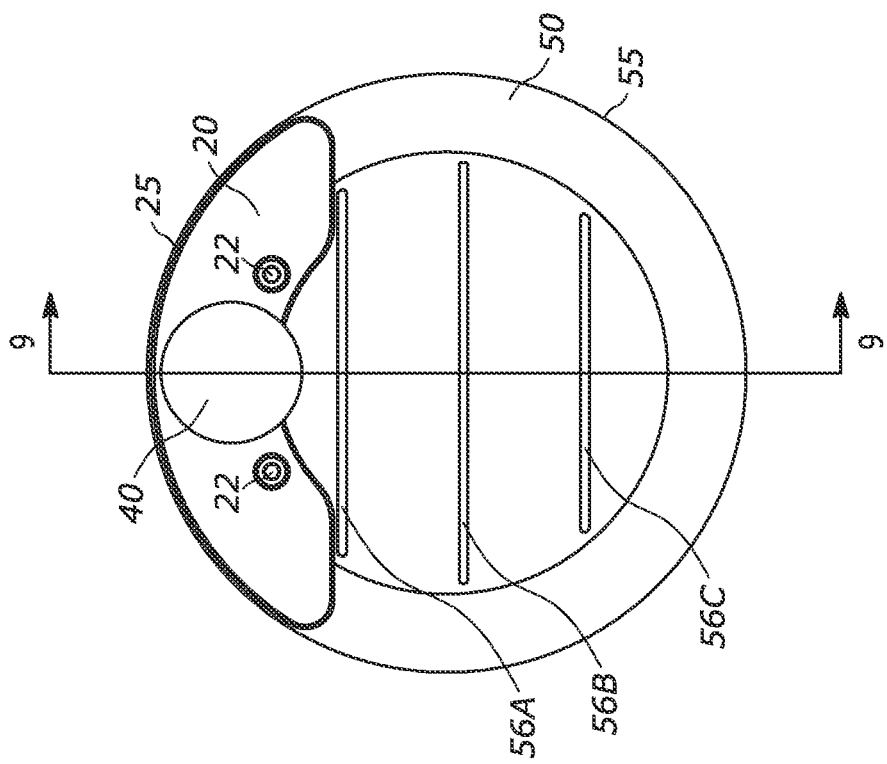
Figure 9:
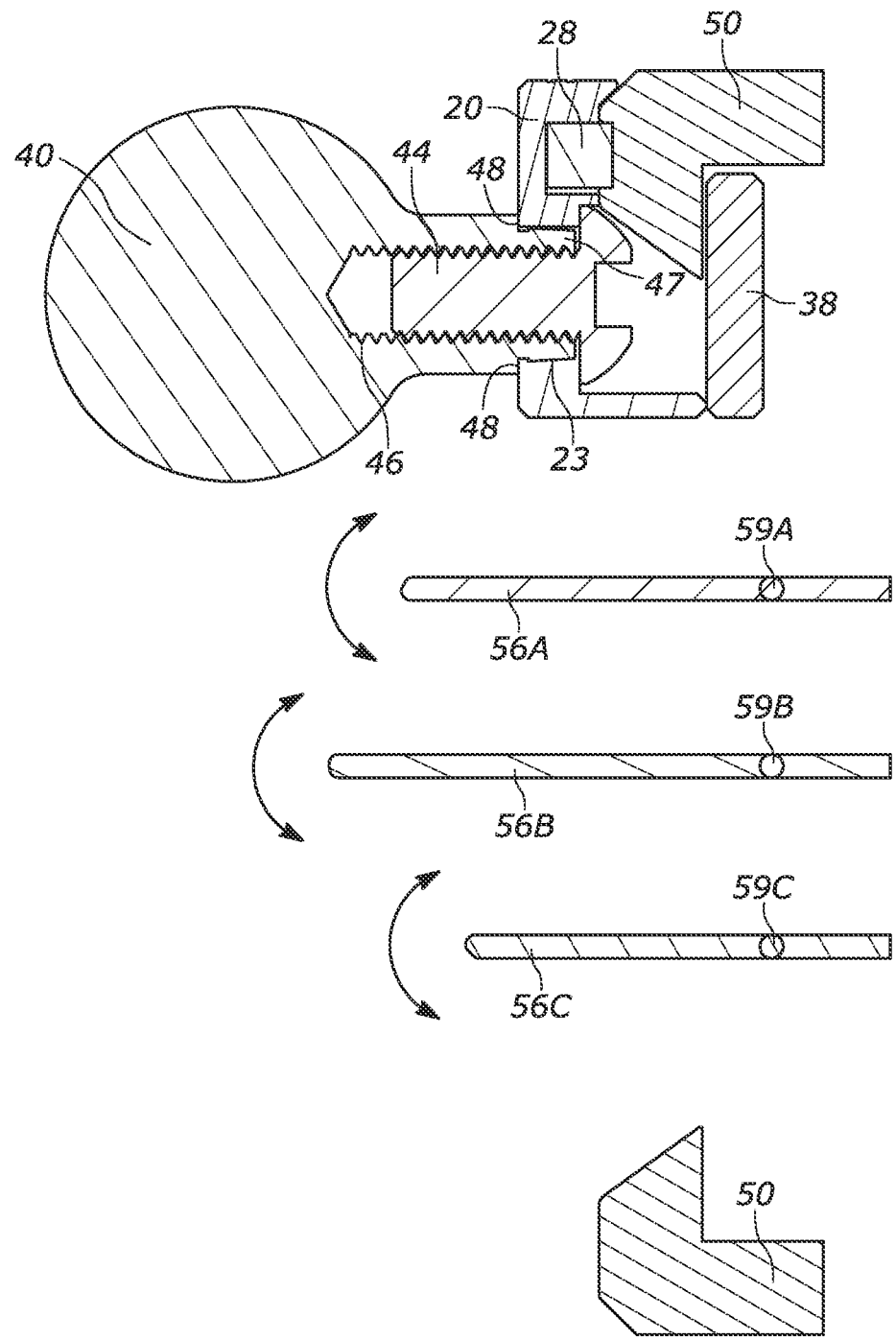
FIG. 9 is a cut-away view of the dashboard mounting device shown in FIG. 1 in the context of an air vent.
Figure 10:
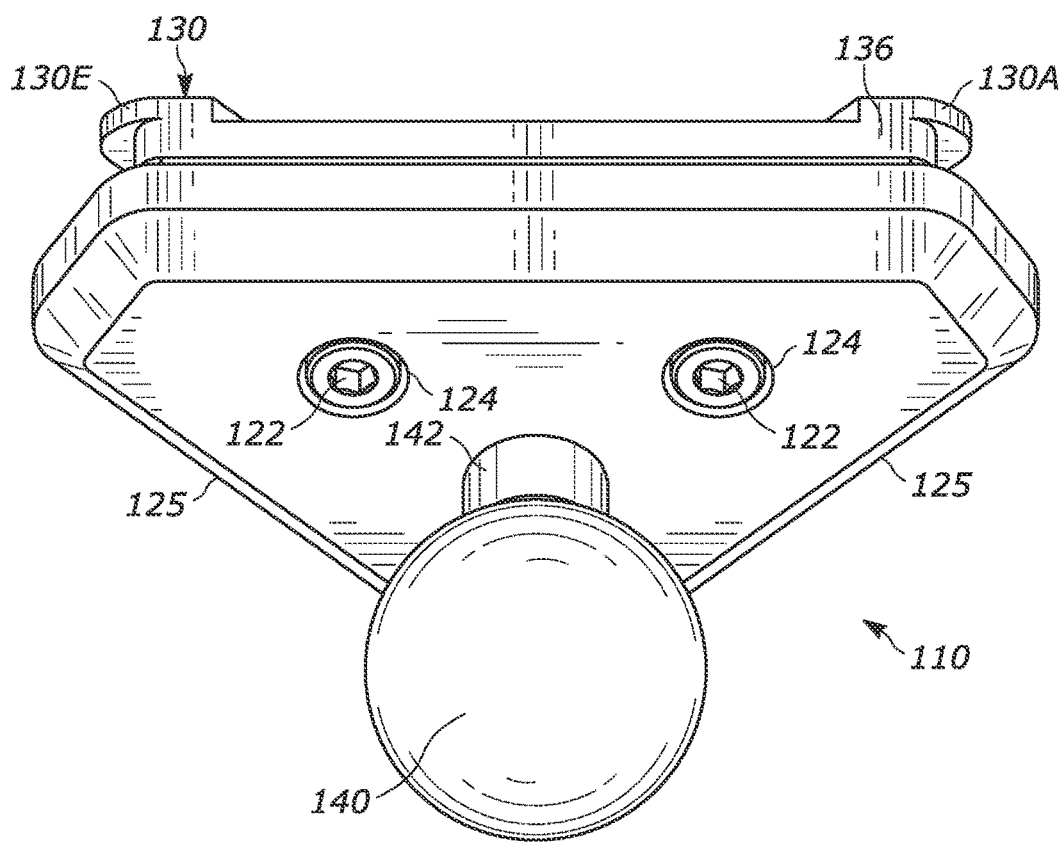
FIG. 10 is a top perspective view of a dashboard mounting device according to a second example of the disclosed invention.
Figure 11:
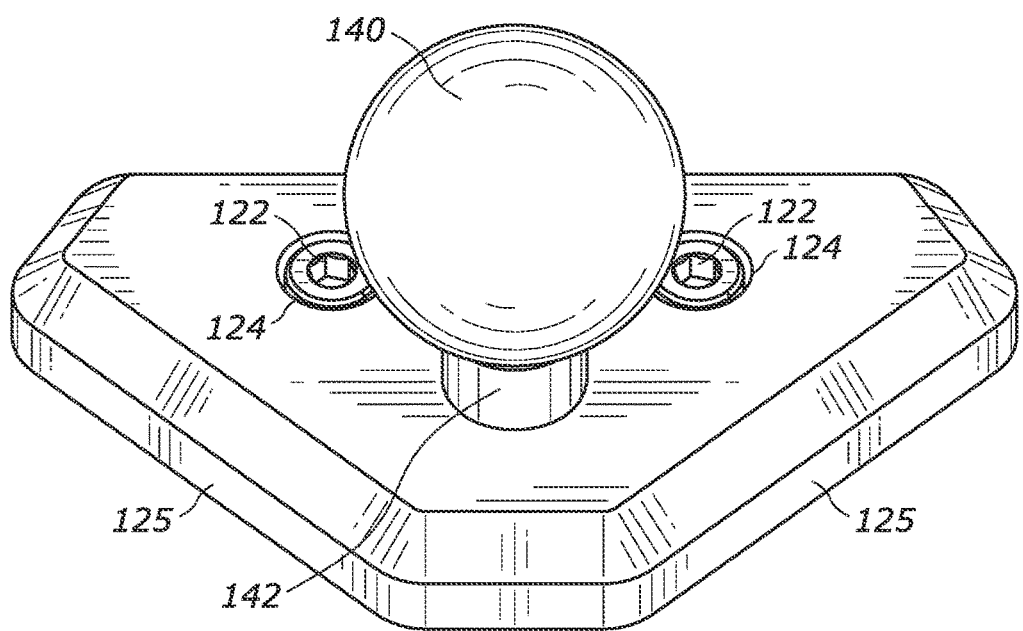
FIG. 11 is a bottom perspective view of the dashboard mounting device shown in FIG. 10.

FIG. 5 also illustrates an elastomeric compression strip 28 disposed within the groove 29 formed in the back side of the front plate 20. The groove 29 follows the profile of the outer edge 25 and corresponds to the shape of a frame of an air vent (components of which are illustrated in FIGS. 7-9). The elastomeric compression strip 28 is preferably a rubber having durometer of 60-75 Shore A medium, or other similarly resilient material. Suitable materials include Viton, Buna N, and Neoprene. The compression strip 28 may be cut to length from a strip of material having a square cross-sectional profile. The width of the elastomeric compression strip 28 is preferably nearly the same as the width of the groove 29, so the groove 29 retains the strip 28 without the use of adhesive glue, tape, or backing.

For cosmetic reasons it is desirable for the groove 29 to have ends 27 contained within the front plate 20. Although the groove 29 could be extended all the way to the edge of the front plate 20, this would leave the elastomeric compression strip 28 exposed and visible to the occupants of the vehicle. The preferred mounting device 10 therefore has a hidden groove 29. In mounting devices 10 with a hidden groove, however, it was discovered that edges present at the ends 27 of the groove 29 may scratch the frame to which they are attached. To eliminate such scratching, the elastomeric compression strip 28 preferably provides greater resistance to compression at the ends 27 of the groove 29. This greater resistance can be achieved by means of providing a non-uniform stiffness, as described herein.

Figure 30A:
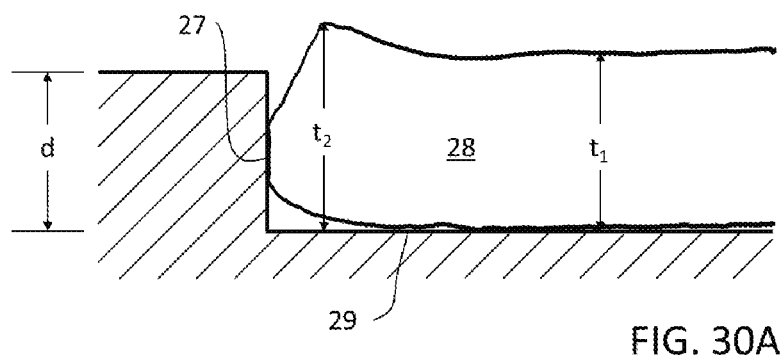
FIGS. 30A-30D illustrate four means for achieving a nonuniform stiffness using an elastomeric compression strip.
Figure 30B:
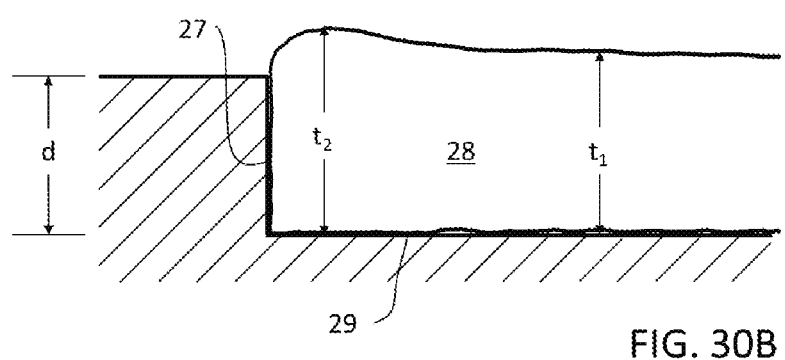
Figure 30C:
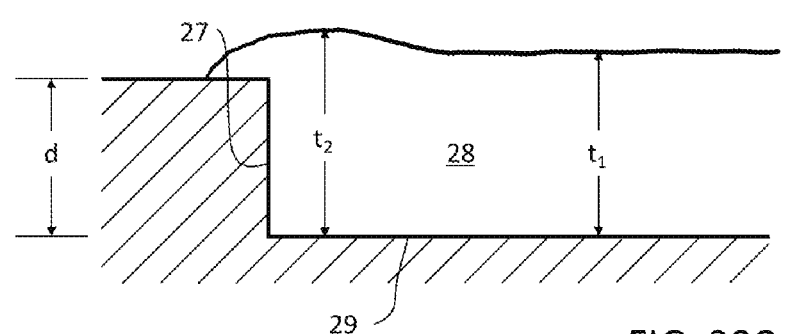

In a preferred embodiment, the elastomeric compression strip 28 has an uncompressed length greater than the length of the groove 29. When installed within the groove 29, excess length of the elastomeric compression strip 28 must be compressed or squeezed into the groove 29, causing ends of the strip 28 to bulge upwards and out of the groove 29 at the ends 27A and 27B of the groove 29. As shown in FIGS. 30A-30C, this creates a thickness t2 adjacent to the ends 27 of the groove, which is greater than the thickness t1 of the strip 28 within most of the groove 29. Both the thickness t1 and t2 are greater than the depth d of the groove, as shown in FIG. 30A. This difference in thickness provides a non-uniform stiffness in the elastomeric compression strip. In preferred embodiments the thickness t2 is approximately 15% larger than the thickness t1. Compressing the strip 28 at the ends 27 of the groove 29 further helps hold the strip 28 in place within the groove 29, by creating a spring force to bind the strip 28 in place. It also protects the frame of the air vent from damage from the edge at the ends 27 of the groove 29. In a more preferred embodiment, the length of the elastomeric compression strip 28 is 5-7% greater than the length of the groove 29. Outside of the range, there is either not enough of a preload in ends 27, or the assembly becomes difficult.

Alternatively, the elastomeric compression strip 28 has different thicknesses formed by molding the elastomeric compression strip 28 having thickness of t1 throughout most of the groove 29 and a greater thickness of t2 in the ends 27, as shown in FIGS. 30B and 30C. Again, this difference in thickness provides a non-uniform stiffness in the elastomeric compression strip. In one embodiment, the elastomeric compression strip 28 could extend outside of the groove 29 past the end 27, as shown in FIG. 30C. As discussed above, the thickness t1 and t2 are both greater than the depth d of the groove 29. The elastomeric compression strip 28 in the embodiments shown in FIGS. 30B and 30C could be molded separately and later installed in the groove 29, or the strip 28 could be molded in place. Tooling to create a molded elastomeric compression strip is expensive, and therefore this approach may be disfavored.

Figure 30D:
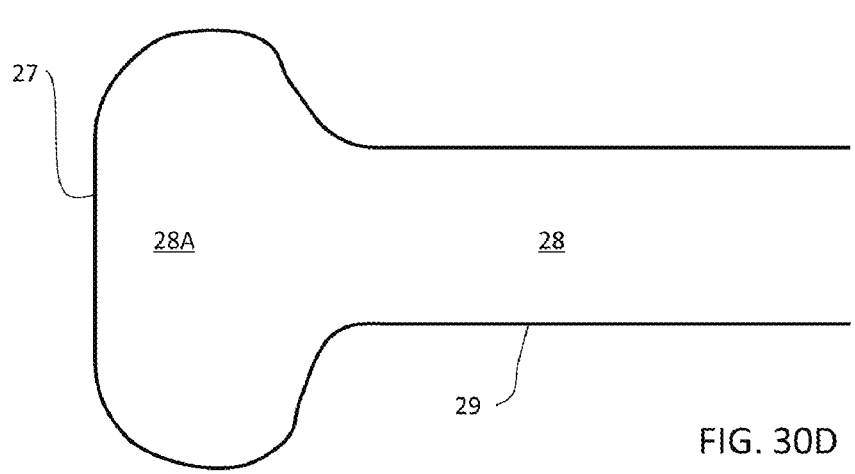

Alternatively, the elastomeric compression strip 28 includes a widened portion 28A adjacent to the ends 27 of the groove 29, as shown in FIG. 30D. This difference in width provides a greater resistance to compression, resulting in a non-uniform stiffness in the elastomeric compression strip.

Alternatively, the elastomeric compression strip 28 includes regions having different material properties. Specifically, the strip 28 includes a portion adjacent to the ends 27 of the groove 29 comprised of stiffer material, i.e., higher durometer rubber.

The front plate 20 may include a lip 21 that extends away from the back side of the front plate 20. The lip 21 follows the outer edge 25 of the front plate 20. The lip 21 serves to secure mechanically constrain the mounting device 10 when it is installed on a frame of an air vent.

Figure 6:
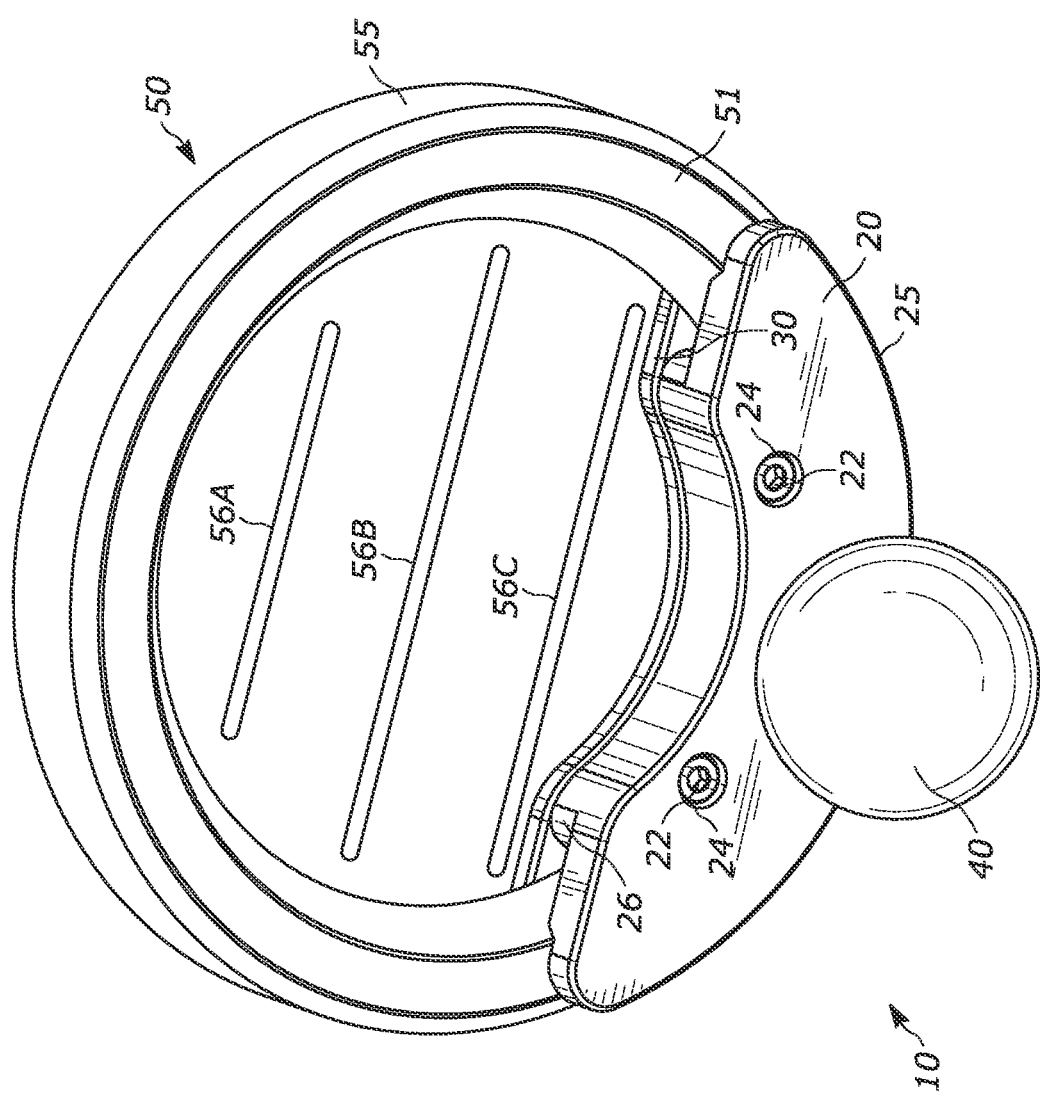
FIG. 6 is a perspective view of the dashboard mounting device shown in FIG. 1 in context of a frame for an air vent.

With reference to FIG. 6, the mounting device 10 is installed on a frame 50 associated with the air vent (components of which are illustrated in FIGS. 7-9) of a vehicle. The front plate 20 sits on an outer, front surface 51 of the frame 50, and the back plate 30 clamps the frame 50 between the front plate 20 and the back plate 30. The outer edge 25 of the front plate 20 aligns and mates with an outer edge 55 of the front plate.

With reference to FIGS. 7 and 8, a method for installing the mounting device 10 is described. The mounting device 10 is preferably designed and installed on the air vent such that the mounting device 10 does not obstruct the louvers 56A, 56B, 56C associated with the air vent. Installation of the mounting device 10 may require opening the louvers 56A, 56B, 56C for full air flow, as shown in FIG. 7. The screws 22 on the mounting device must be loosened to open the gap between the front plate 20 and the back plate 30. In some embodiments the screws 22 could be retained such that they are difficult or impossible to completely remove from the back plate 30, thus preventing a user from losing the screws. The mounting device 10 shown in FIGS. 1-9 is designed to fit through the larger gap between the louver 56A and the frame 50. The mounting device can then be placed onto the frame 50 such that the back plate 30 extends behind the frame 50 and the front plate 20 extends to the front of the frame 50. As shown in FIG. 8, the air vent may be rotated to a desired location while the mounting device 10 is loosely fit to the frame. To secure the mounting device 10 to the frame 50, the screws 24 are tightened, which compresses the elastomeric compression strip 28 against the front surface 51 of the frame 50.

The disclosed method of installation is simplified and provides a rigid mounting point for electronic devices without permanently damaging the dashboard or requiring disassembly of the dashboard to access hard mounting points in a vehicle. Vent frames in most vehicles advantageously provide a semi-rigid surface relative to most other dashboard surfaces, which are often formed from soft or padded plastic. Vent frames further provide a stiff shape because of their size and their desired function of holding the vent in place within the dashboard. Mounting to the vent frame therefore provides a substantially more rigid mounting point even when compared to known solutions such as using threaded fasteners to secure a mount on the soft or padded plastic of a dashboard. Where such threaded fasteners are used, they are prone to tearing out of the plastic in addition to leaving undesirable holes if the mounting device is removed.

FIG. 9 provides a cross-sectional view of the mounting device 10, installed on the frame 50 of the air vent. The frame, as described herein, is a portion of the dashboard of a vehicle, or a rigid piece inserted in the dashboard. The frame surrounds a movable air vent. The frame 50 is captured between the front plate 20 and the back plate 30. The elastomeric compression strip 28 provides a resilient element that maintains force against the frame and provides a high friction element to hold the mounting device 10 rigidly in place. The shape of the mounting device 10 provides free movement for the louvers 56 on the air vent. Each of the louvers pivots about a pivot point 59A, 59B, 59C, allowing motion illustrated by the arrows.

In the example illustrated in FIG. 9, the ball coupler 40 is attached to the front plate 20 using threaded fastener 44. In preferred embodiments a pocket 23 is provided in the front plate 20, to receive a knurled portion 47 of the ball coupler 40. A shoulder 48 is adjacent to the knurled portion 47, such that when the threaded fastener 44 draws the knurled portion 47 into the pocket 23 the shoulder provides support for the ball coupler 40 against a front surface of the front plate 20. The threaded fastener 44 screws into a blind threaded hole 46 that is substantially concentric within the neck 42 of the ball coupler 40. Although other configurations could be used, this example is preferred because it holds the ball coupler 40 rigidly in place such that it will not rotate relative to the mounting device during use.

Second Embodiment

A second mounting device 110 is shown in FIGS. 10-15, designed for use with air vents that have at least one substantially square corner in the frame. The components of the mounting device 110 are substantially similar to components of the mounting device 10 described above, except where differences are specifically described in the following paragraphs.

The mounting device 110 includes a ball coupler 140 with a neck 142. The ball coupler 140 is mounted on a front plate 120. In contrast to the mounting device 10, the front plate 120 illustrated in FIGS. 10-15 includes straight outer edges 125 configured to substantially align with edges of a frame with a substantially square corner (e.g., the frame 355 shown in FIGS. 28-29). The front plate 120 may include holes 124 for receiving mounting screws 122. The holes 124 may be countersunk to receive the head of a socket head cap screw or other machine screw, as shown. The neck 142 of the ball coupler 140 is secured to the front plate 120. The same features described above for mounting the ball coupler 40 to the mounting plate 20 in the first mounting device 10 may be used in mounting device 110.

Figure 12:
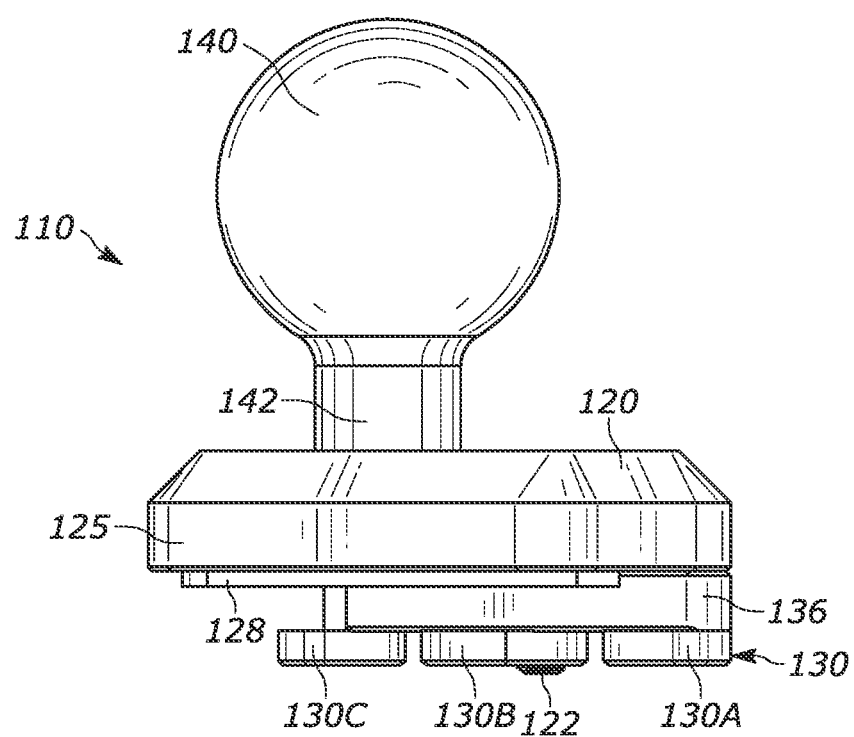
FIG. 12 is a right-side elevation view of the dashboard mounting device shown in FIG. 10.
Figure 13:
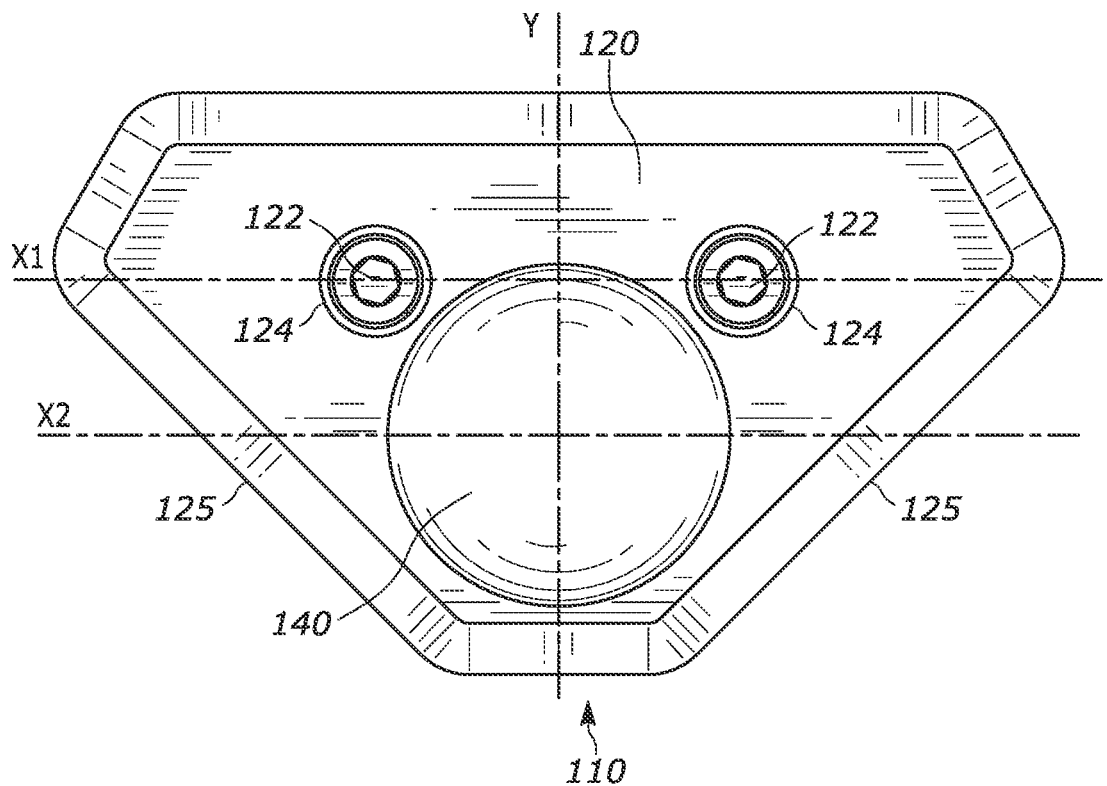
FIG. 13 is a front elevation view of the dashboard mounting device shown in FIG. 10.

The mounting device 110 also includes a back plate 130, which includes an integral spacing flange 136, as shown in FIG. 12. In some examples the spacer may be a separate component with through-holes to receive the fasteners 122.

Figure 14:
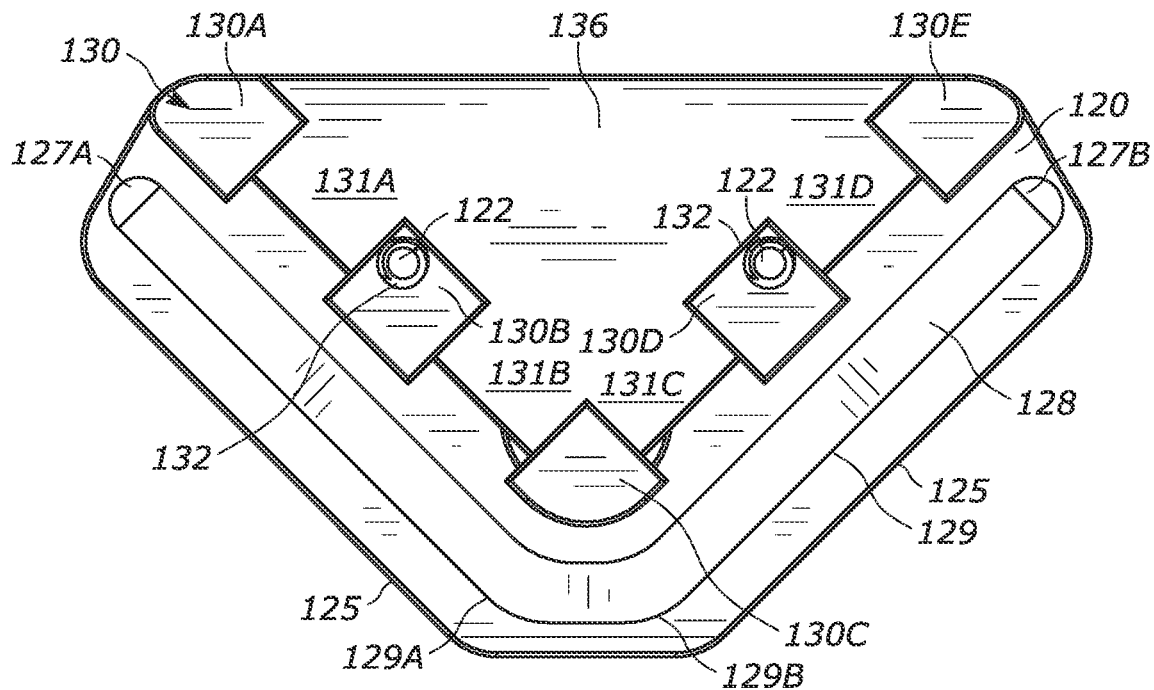
FIG. 14 is a rear elevation view of the dashboard mounting device shown in FIG. 10.

With reference to FIG. 12, the fasteners 122 may extend into or through the back plate 130. With reference to FIG. 14, the back plate 130 may have holes 132. In the preferred embodiment, the holes 132 are threaded to receive the fasteners 122. Alternative embodiments include separate hardware such as a nut and washers, but this approach is less favored for the same reasons discussed above with mounting device 10. The fasteners 122 serve to clamp the back plate 130 to the front plate 120. FIG. 14 also illustrates an elastomeric compression strip 128 disposed within the groove 129 formed in the back side of the front plate 120. The groove 129 substantially follows the profile of outer edges 125 including two straight-line segments corresponding to the shape of a frame of an air vent (e.g., the frame shown in FIGS. 28-29). The elastomeric compression strip 128 is preferably cut to length from a strip of rubber, with features and characteristics described above for the elastomeric compression strip 28.

As described above, the elastomeric compression strip 128 preferably has an uncompressed length greater than the length of the groove 129. When installed within the groove, the elastomeric compression strip 128 is compressed to pre-load the elastomeric compression strip 128 against the ends 127A and 127B of the groove 129. Compressing the strip 128 at the ends 127A, 127B of the groove 129 serves the same purposes as discussed above for the strips 28 in mounting device 10. In a more preferred embodiment, the uncompressed length of the elastomeric compression strip 128 is 5-7% greater than the length of the groove 129.

As described above, the elastomeric compression strip 128 may alternatively be provided with a non-uniform thickness by molding a molded elastomeric compression strip 128 having thicker regions in the ends.

The groove 129 illustrated in FIG. 14 includes two corner angles 129A and 129B. The corner angles 129A and 129B provide a more gradual corner for the elastomeric compression strip 128, as compared to a simple right-angle intersection. This gradual corner improves assembly, avoiding the need to reshape the elastomeric compression strip 128.

A lip may be provided on the back side of the front plate. The lip may serve to orient the mounting device 110 and to provide mechanical interaction with a frame of an air vent (e.g., frame 355 shown in FIGS. 28 and 29). This mechanical interaction may secure the mounting device 110 more rigidly to minimize or eliminate the chance that jerking motion on the vehicle will shake the mounting device 110 loose from the air vent.

Figure 15:
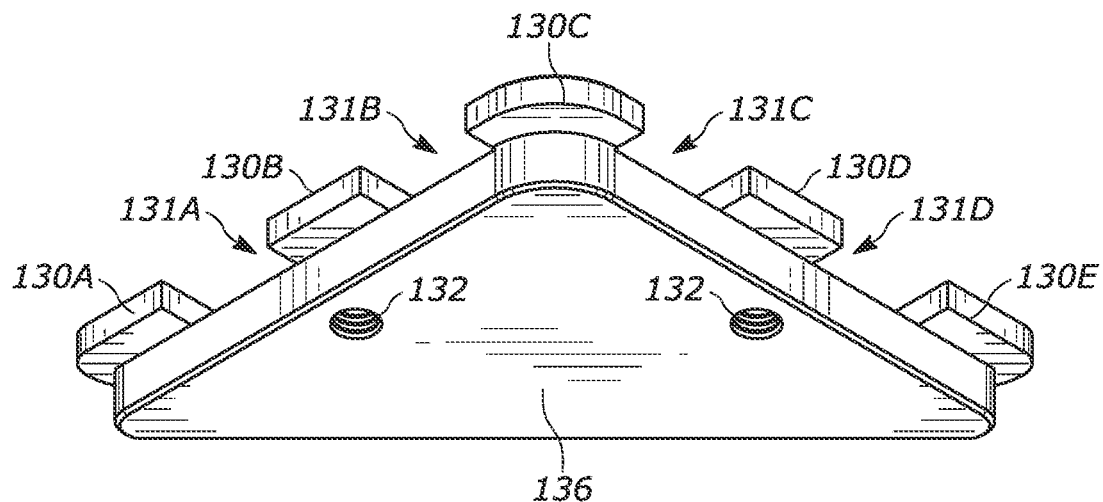
FIG. 15 is a bottom perspective view of the spacer and back plates of the dashboard mounting device shown in FIG. 10.
Figure 16:
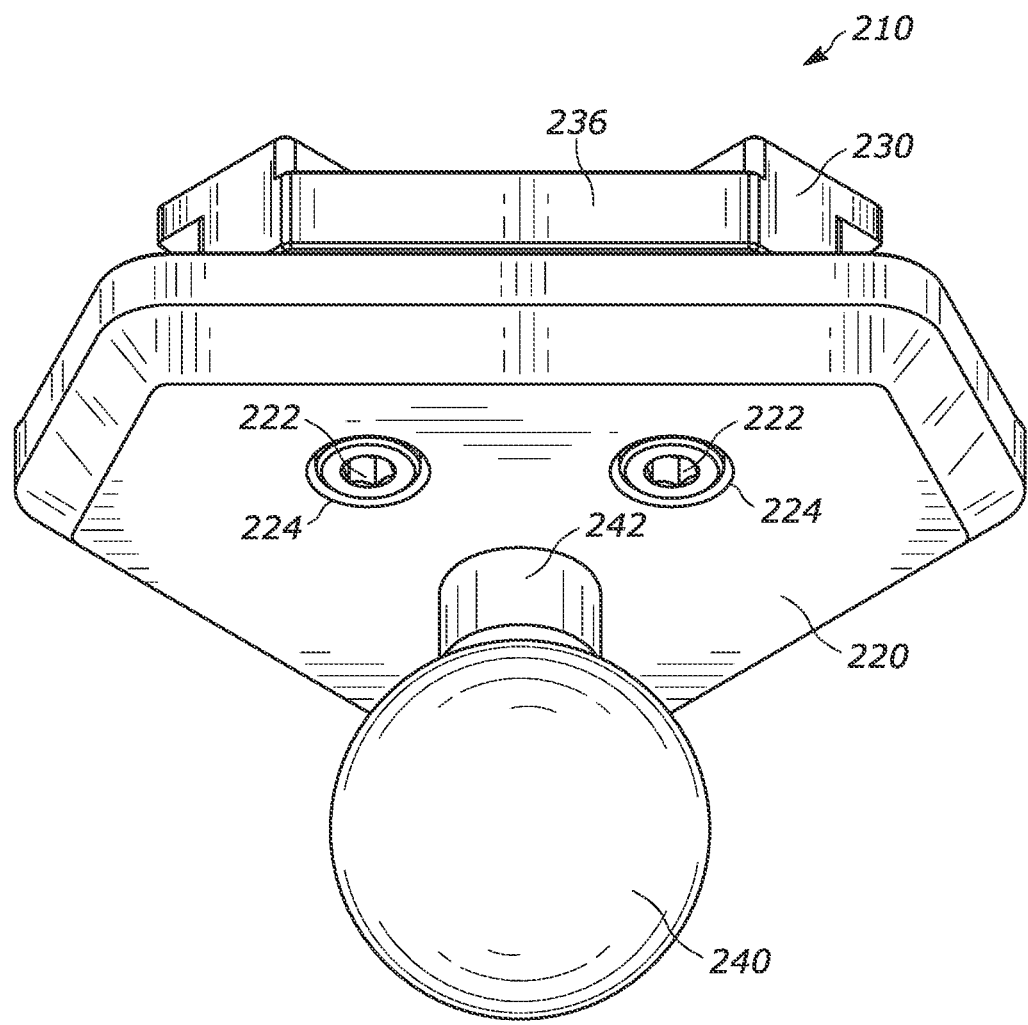
FIG. 16 is a top perspective view of a dashboard mounting device according to a third example of the disclosed invention.
Figure 17:
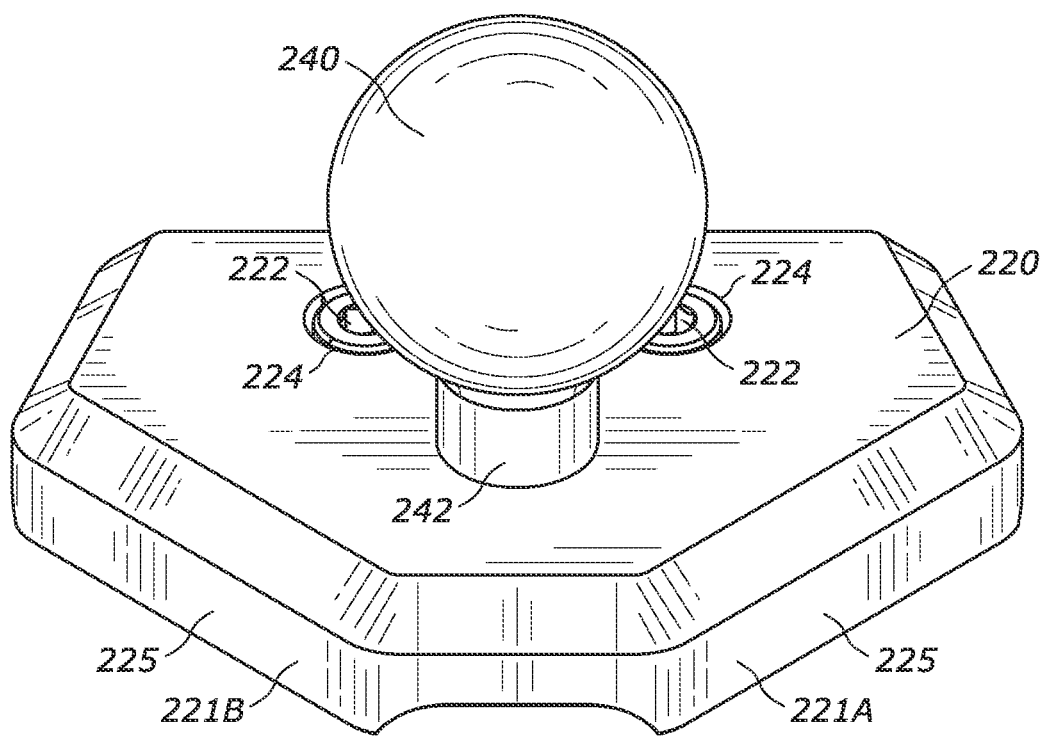
FIG. 17 is a bottom perspective view of the dashboard mounting device shown in FIG. 16.
Figure 18:
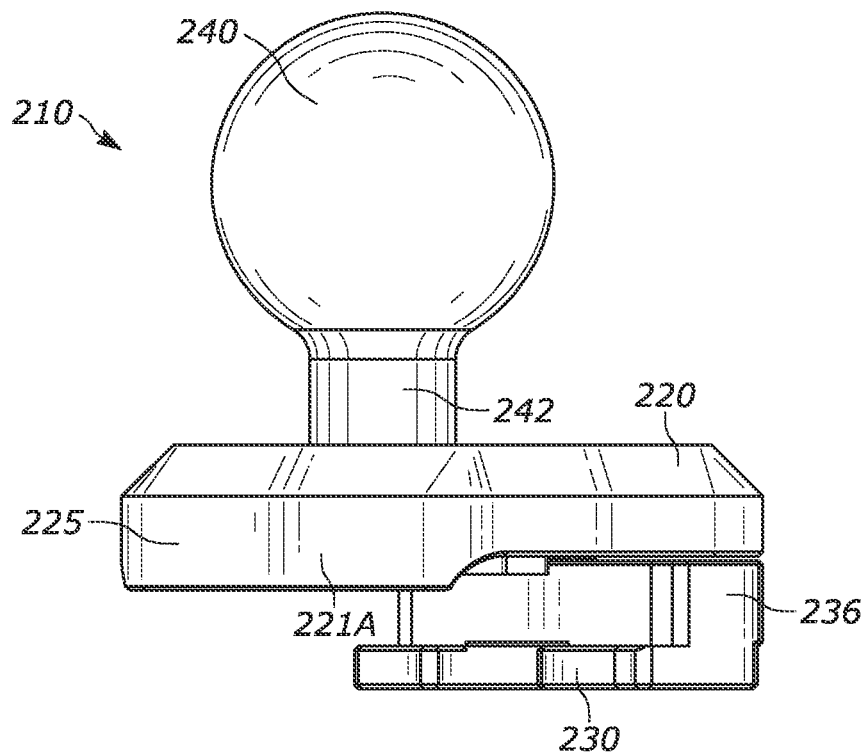
FIG. 18 is a right-side elevation view of the dashboard mounting device shown in FIG. 16.
Figure 19:
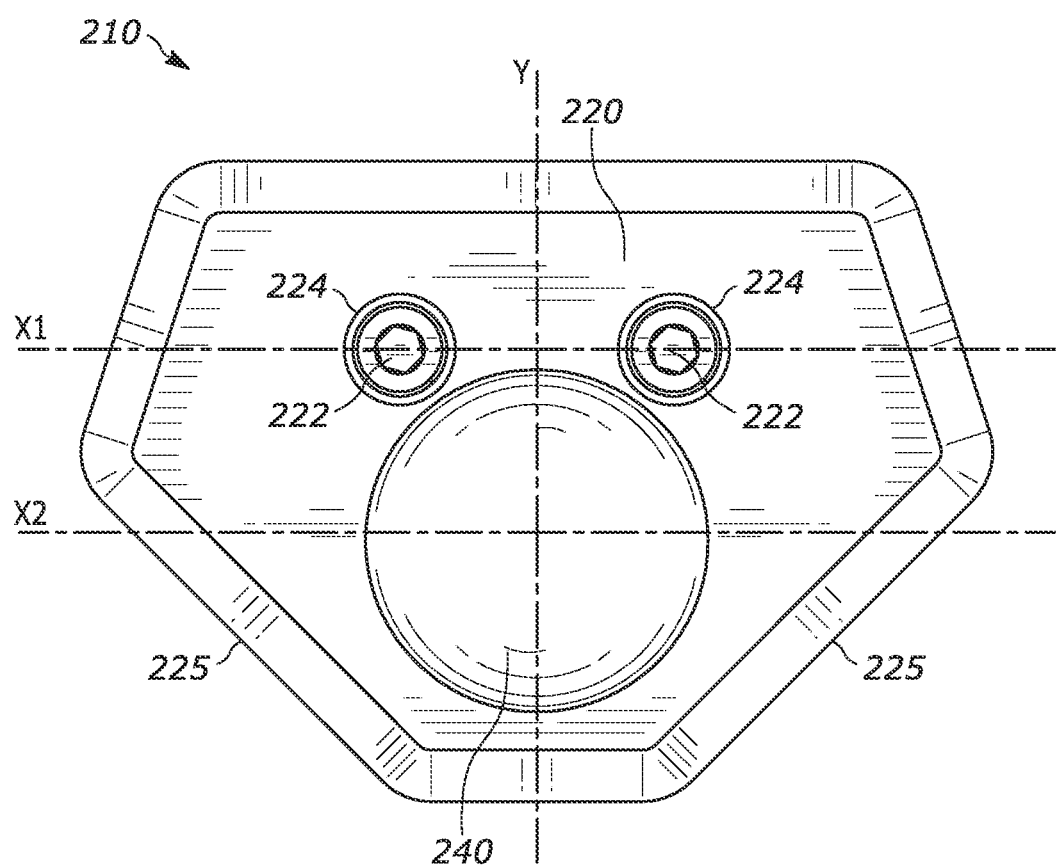
FIG. 19 is a front elevation view of the dashboard mounting device shown in FIG. 16.

The back plate 130 of mounting device 110 includes a series of segments 130A, 130B, 130C, 130D, and 130E as illustrated in FIGS. 14 and 15. Each of these segments 130A-130E are integrally attached to the spacing flange 136. Channels 131A-131D exist between the respective segments 130A-130E. Specifically, channel 131A exists between back plate segments 130A and 130B. Channel 131B exists between backplate segments 130B and 130C. Channel 131C exists between back plate segments 130C and 130D. And channel 131D exists between back plate segments 130D and 130E. The channels 131A-131D provide space such that louvers (e.g., louvers 356A, 356B shown in FIGS. 28-29) have freedom to pivot within the channels 131A-131D. The back plate segments 130A-130E are sized to minimize or eliminate obstructing movement of the louvers. The back plate segments 130A-130E may be customized to optimize how they fit with air vents in certain models of vehicles. As shown in FIG. 14, the mounting device 110 includes back plate segments 130B and 130D that are substantially square. Segments 130A and 130E are similarly substantially square but have rounded corners following the profile of the mounting device 110. Segment 130C includes a rounded portion to follow a shape of the inner surfaces of an air vent on which the mounting device 110 is to be installed. By shaping segments 130A-130E to custom fit one or more air vents on a particular vehicle, the mounting device can avoid interfering with the air vent features of that particular vehicle. This approach provides robust clamping that is custom designed to match specific vehicles. When installed on an air vent, louvers are present in channels 131A-131D on only one side 125 of the mounting device 110. For example, depending on the orientation of the mounting device relative to the air vent, only channels 131A and 131B might receive louvers. In another orientation, only channels 131C and 131D might receive louvers. This allows use of the mounting device 110 on mirror image air vents (e.g., passenger's side versus driver's side of a vehicle) or on different corners within a substantially square or rectangular air vent.

Third Embodiment

A third mounting device 210 is shown in FIGS. 16-21, also designed for use with air vents that have at least one substantially square corner in the frame. The components of the mounting device 210 are substantially similar to components of the mounting devices 10 and 110 described above, except where differences are specifically described in the following paragraphs. The mounting device 210 includes a more compact footprint than mounting device 110, which desirably reduces how much of the air vent is obstructed when mounting device 210 is installed.

The mounting device 210 includes a ball coupler 240 with a neck 242. The ball coupler 240 is mounted on a front plate 220. In contrast to the mounting device 10, the front plate 220 illustrated in FIGS. 16-21 includes straight outer edges 225 configured to substantially align with edges of a frame with a substantially square corner (e.g., the frame 355 shown in FIGS. 28-29). The front plate 220 may include holes 224 for receiving mounting screws 222. The holes 224 may be countersunk to receive the head of a socket head cap screw or other machine screw, as shown. The neck 242 of the ball coupler 240 is secured to the front plate 220. The same features described above for mounting the ball coupler 40 to the mounting plate 20 in the first mounting device 10 may be used in mounting device 210.

The mounting device 210 also includes a back plate 230, which includes an integral spacing flange 236. In some examples the spacer 236 may be a separate component with through-holes to receive the fasteners 222.

Figure 20:
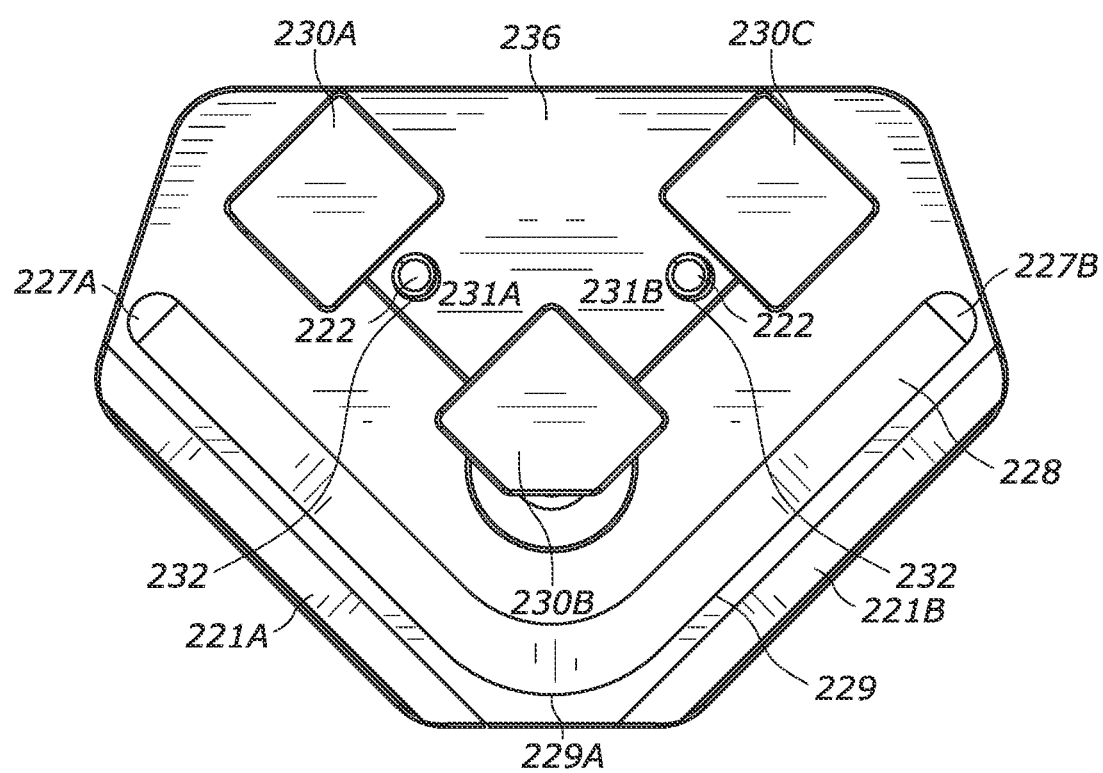
FIG. 20 is a rear elevation view of the dashboard mounting device shown in FIG. 16.

Similar to the mounting devices 10 and 120, the fasteners 222 may extend into or through the back plate 230. With reference to FIG. 20, the back plate 230 may have holes 232 to receive screws 222. In the preferred embodiment, the holes 232 are threaded to receive the fasteners 222. Alternative embodiments include separate hardware such as a nut and washers, but this approach is less favored for the same reasons discussed above with mounting device 10. The fasteners 222 serve to clamp the back plate 230 to the front plate 220. FIG. 20 also illustrates an elastomeric compression strip 228 disposed within the groove 229 formed in the back side of the front plate 220. The groove 229 substantially follows the profile of outer edges 225 including two straight-line segments 225 corresponding to the shape of a frame of an air vent (e.g., the frame 355 shown in FIGS. 28-29). The elastomeric compression strip 228 is preferably cut to length from a strip of rubber, silicone, or other resilient material having a square cross-sectional profile. The elastomeric compression strip 228 is preferably cut to length from a strip of rubber, with features and characteristics described above for the elastomeric compression strip 28.

As described above, the elastomeric compression strip 228 preferably has an uncompressed length greater than the length of the groove 229. When installed within the groove, the elastomeric compression strip 228 is compressed to pre-load the elastomeric compression strip 228 against the ends 227A and 227B of the groove 229. Compressing the strip 228 at the ends 227 of the groove 229 serves the same purposes as discussed above for the strip 28 in mounting device 10. In a more preferred embodiment, the uncompressed length of the elastomeric compression strip 228 is 5-7% greater than the length of the groove 229.

As described above, the elastomeric compression strip 228 may alternatively be provided with a non-uniform thickness by molding a molded elastomeric compression strip 228 having thicker regions in the ends.

A preferred aspect of the groove 229 is illustrated in FIG. 20, which includes an arcuate region 229A. In contrast to the groove 129 shown in FIG. 14, the arcuate region 229A has a larger radius that eliminates corners 129A and 129B. The relatively larger radius in the region 229A allows the elastomeric compression strip 228 to compress more uniformly throughout the length of the groove 229, which improves the pre-load between the elastomeric compression strip 228 and the ends 227A and 227B of the groove 229.

Lips 221A, 221B are provided on the back side of the front plate 220, along the outer edges 225. The lips 221A, 221B serve to orient the mounting device 210 and to provide mechanical interaction with a frame of an air vent (e.g., frame 355 shown in FIGS. 28 and 29). This mechanical interaction may secure the mounting device 210 more rigidly to minimize or eliminate the chance that jerking motion on the vehicle will shake the mounting device 210 loose from the air vent. Although providing one or more retainer lip is preferred, some vehicle dashboard shapes do not include the minimum recess to allow retainer lips to exist.

Figure 21:
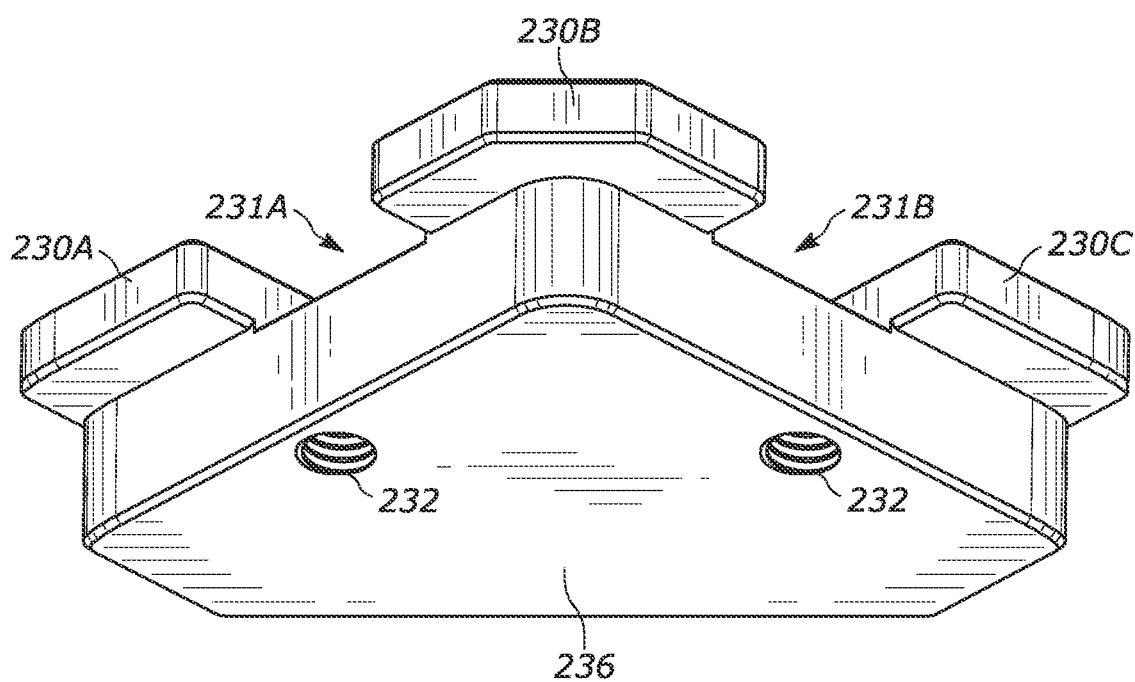
FIG. 21 is a bottom perspective view of the spacer and back plates of the dashboard mounting device shown in FIG. 21.
Figure 22:
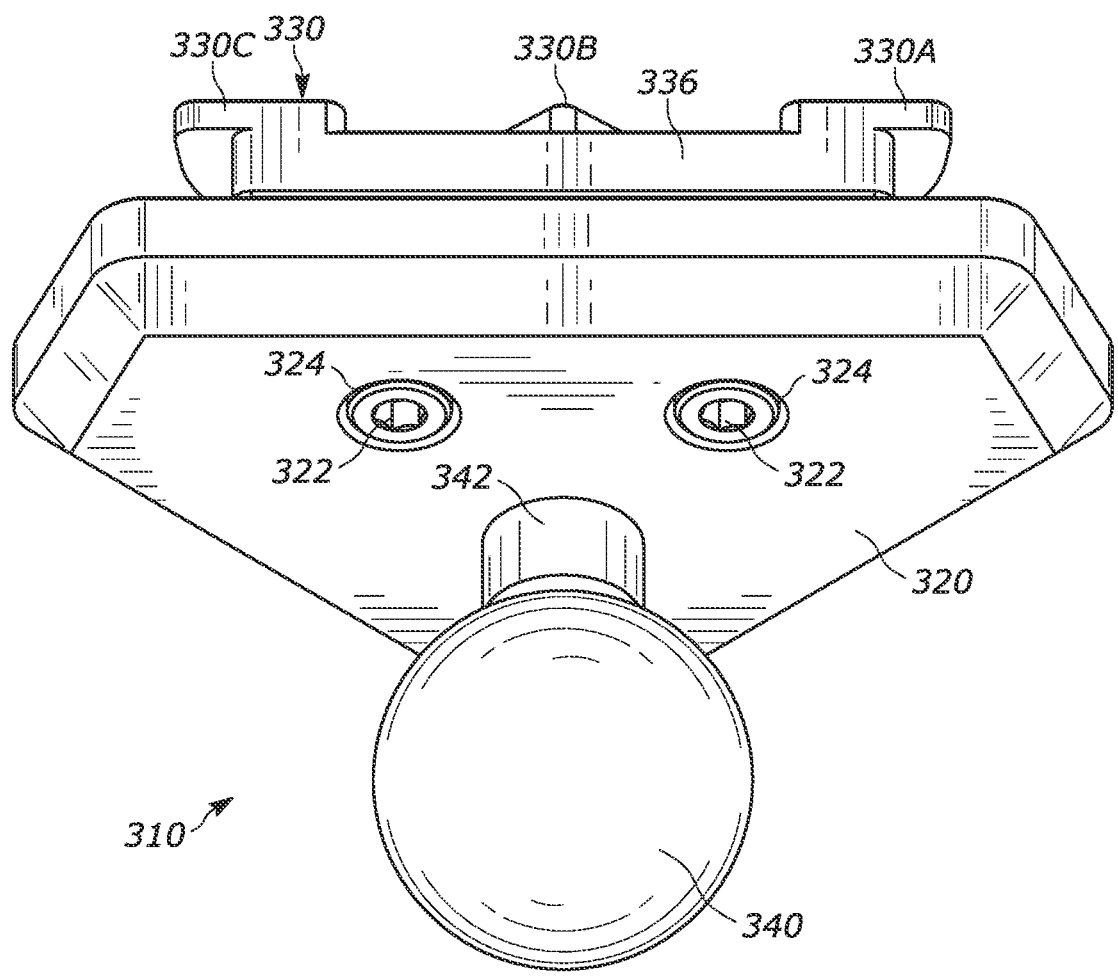
FIG. 22 is a top perspective view of a dashboard mounting device according to a fourth example of the disclosed invention.
Figure 23:
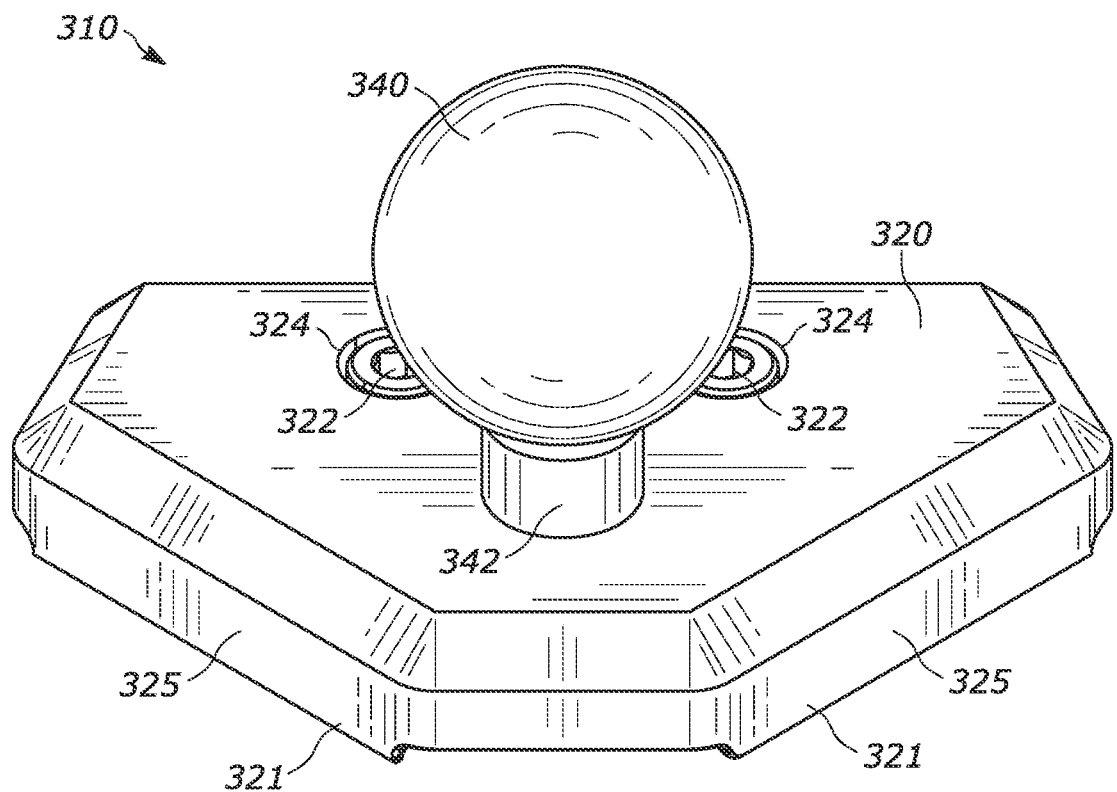
FIG. 23 is a bottom perspective view of the dashboard mounting device shown in FIG. 22.
Figure 24:
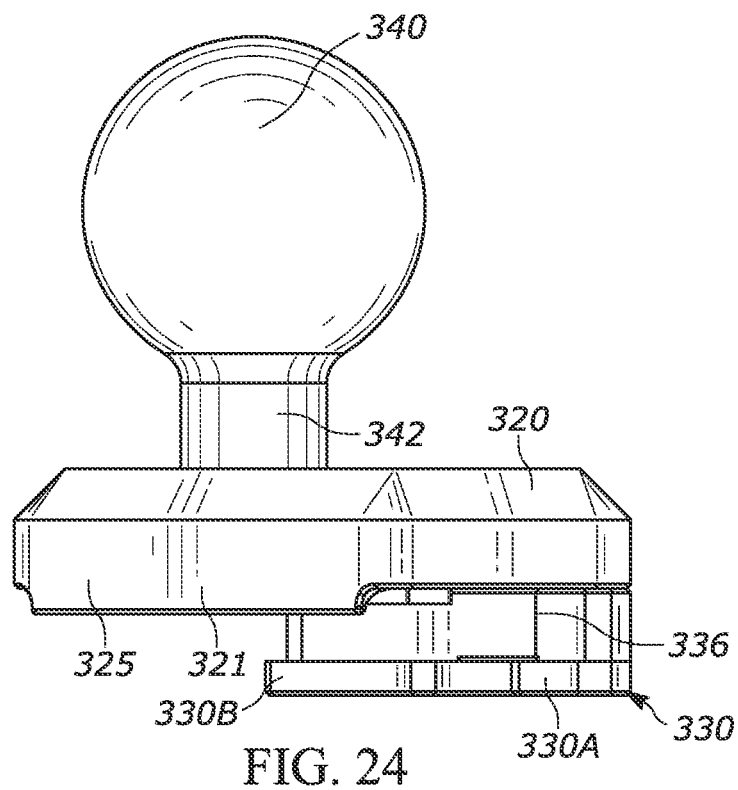
FIG. 24 is a right-side elevation view of the dashboard mounting device shown in FIG. 22.
Figure 25:
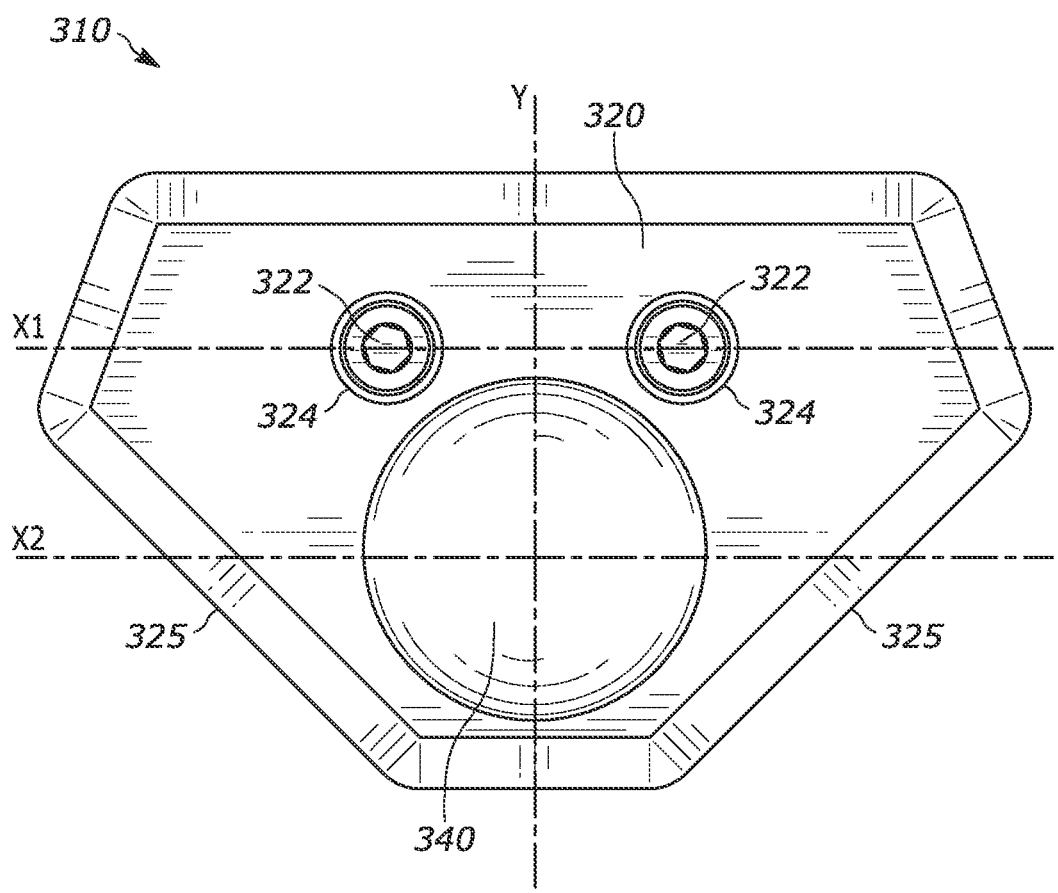
FIG. 25 is a front elevation view of the dashboard mounting device shown in FIG. 22.

The back plate 230 of mounting device 210 includes a series of segments 230A, 230B, and 230C as illustrated in FIGS. 20 and 21. Each of these segments 230A-230C are integrally attached to the spacing flange 236. Channels 231A and 231B exist between the respective segments 230A-230C. Specifically, channel 231A exists between back plate segments 230A and 230B. Channel 231B exists between backplate segments 230B and 230C. As discussed above, the channels 231A, 231B provide space such that louvers (e.g., louvers 356A, 356B shown in FIGS. 28-29) have freedom to pivot within the channels 231A, 231B. The back plate segments 230A-230C are sized to minimize or eliminate obstructing movement of the louvers. The back plate segments 230A-230C may be customized to optimize how they fit with air vents in certain models of vehicles. As shown in FIG. 20, the mounting device 210 includes somewhat rectangular back plate segments 230A and 230C, and the segment 230B includes a notched corner to avoid interfering with a particular air vent. The advantages and reasons for customizing back plate segments 230A-230C are the same as those discussed above for mounting device 110. When installed on an air vent, a louver is present in the channel 231A, 231B on only one side 225 of the mounting device 210. For example, depending on the orientation of the mounting device relative to the air vent, only channel 231A might receive a louver. In another orientation, only channels 231B might receive a louver. This allows use of the mounting device 210 on mirror image air vents (e.g., passenger's side versus driver's side of a vehicle) or on different corners within a substantially square or rectangular air vent.

Fourth Embodiment

A fourth mounting device 310 is shown in FIGS. 22-29, also designed for use with air vents that have at least one substantially square corner in the frame. The components of the mounting device 310 are substantially similar to components of the mounting devices 10, 110, and 210 described above, except where differences are specifically described in the following paragraphs. The mounting device 310 includes a compact footprint similar to mounting device 210, which desirably reduces how much of the air vent is obstructed when mounting device 310 is installed.

The mounting device 310 includes a ball coupler 340 with a neck 342. The ball coupler 340 is mounted on a front plate 320. In contrast to the mounting device 10, the front plate 320 illustrated in FIGS. 25-29 includes straight outer edges 325 configured to substantially align with edges of a frame with a substantially square corner (e.g., the frame 355 shown in FIGS. 28-29). The front plate 320 may include holes 324 for receiving mounting screws 322. The holes 324 may be countersunk to receive the head of a socket head cap screw or other machine screw, as shown. The neck 342 of the ball coupler 340 is secured to the front plate 320. The same features described above for mounting the ball coupler 40 to the mounting plate 20 in the first mounting device 10 may be used in mounting device 310, as described below with respect to FIG. 29.

The mounting device 310 also includes a back plate 330, which includes an integral spacing flange 336. In some examples the spacer 336 may be a separate component with through-holes to receive the fasteners 322.

Figure 26:
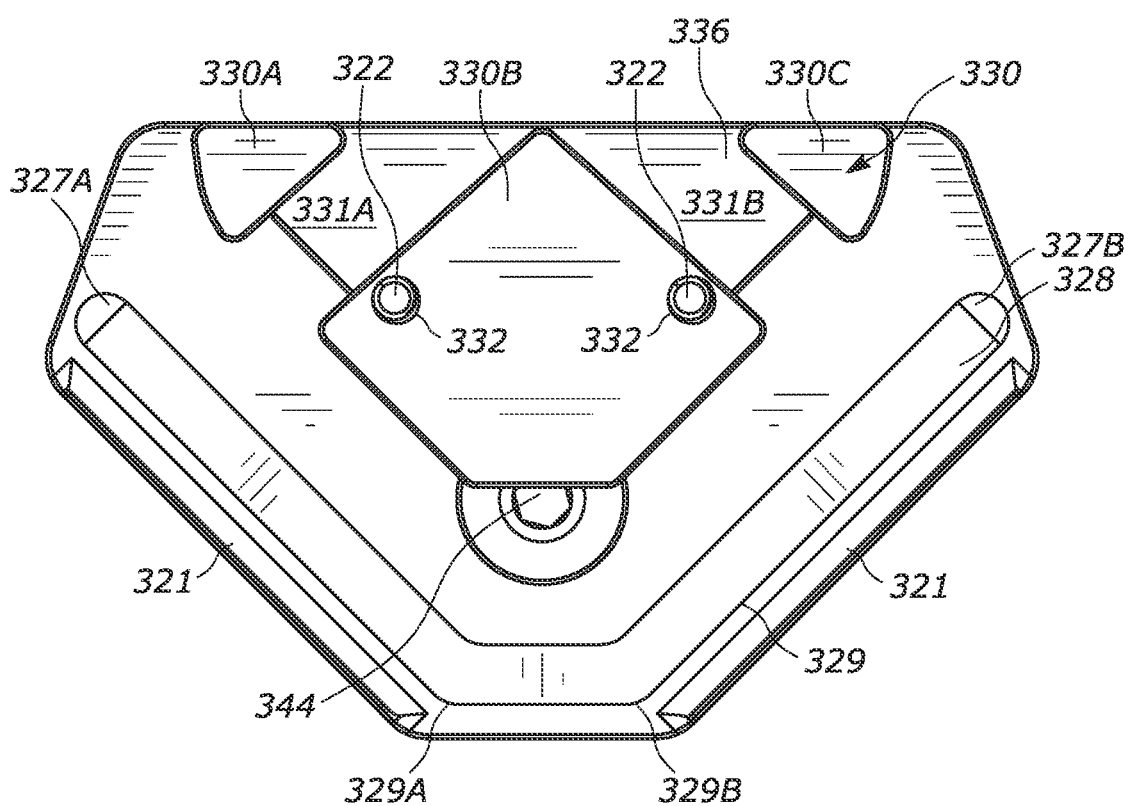
FIG. 26 is a rear elevation view of the dashboard mounting device shown in FIG. 22.

Similar to the mounting devices 10, 120, and 220 the fasteners 322 may extend into or through the back plate 330. With reference to FIG. 26, the back plate 330 may have holes 332 to receive screws 322. In the preferred embodiment, the holes 332 are threaded to receive the fasteners 322. Alternative embodiments include separate hardware such as a nut and washers, but this approach is less favored for the same reasons discussed above with mounting device 10. The fasteners 322 serve to clamp the back plate 330 to the front plate 320. FIG. 26 also illustrates an elastomeric compression strip 328 disposed within the groove 329 formed in the back side of the front plate 320. The groove 329 substantially follows the profile of outer edges 325 including two straight-line segments 325 corresponding to the shape of a frame of an air vent (e.g., the frame 355 shown in FIGS. 28-29). The elastomeric compression strip 328 is preferably cut to length from a strip of rubber, silicone, or other resilient material having a square cross-sectional profile. The elastomeric compression strip 328 is preferably cut to length from a strip of rubber, with features and characteristics described above for the elastomeric compression strip 28.

As described above, the elastomeric compression strip 328 preferably has an uncompressed length greater than the length of the groove 329. When installed within the groove, the elastomeric compression strip 328 is compressed to pre-load the elastomeric compression strip 328 against the ends 327A and 327B of the groove 329. Compressing the strip 328 at the ends 327 of the groove 329 serves the same purposes as discussed above for the strip 28 in mounting device 10. In a more preferred embodiment, the uncompressed length of the elastomeric compression strip 328 is 5-7% greater than the length of the groove 329.

As described above, the elastomeric compression strip 328 may alternatively be provided with a non-uniform thickness by molding a molded elastomeric compression strip 328 having thicker regions in the ends.

The groove 329 illustrated in FIG. 26 includes two corner angles 329A and 329B. The corner angles 329A and 329B provide a more gradual corner for the elastomeric compression strip 328, as compared to a simple right-angle intersection. This gradual corner improves assembly, avoiding the need to reshape the elastomeric compression strip 328.

Lips 321 are provided on the back side of the front plate 320, along the outer edges 325. The lips 321 serve to orient the mounting device 310 and to provide mechanical interaction with a frame of an air vent (e.g., frame 355 shown in FIGS. 28 and 29). This mechanical interaction may secure the mounting device 310 more rigidly to minimize or eliminate the chance that jerking motion on the vehicle will shake the mounting device 310 loose from the air vent. Although providing one or more retainer lip is preferred, some vehicle dashboard shapes do not include the minimum recess to allow retainer lips to exist.

Figure 27:
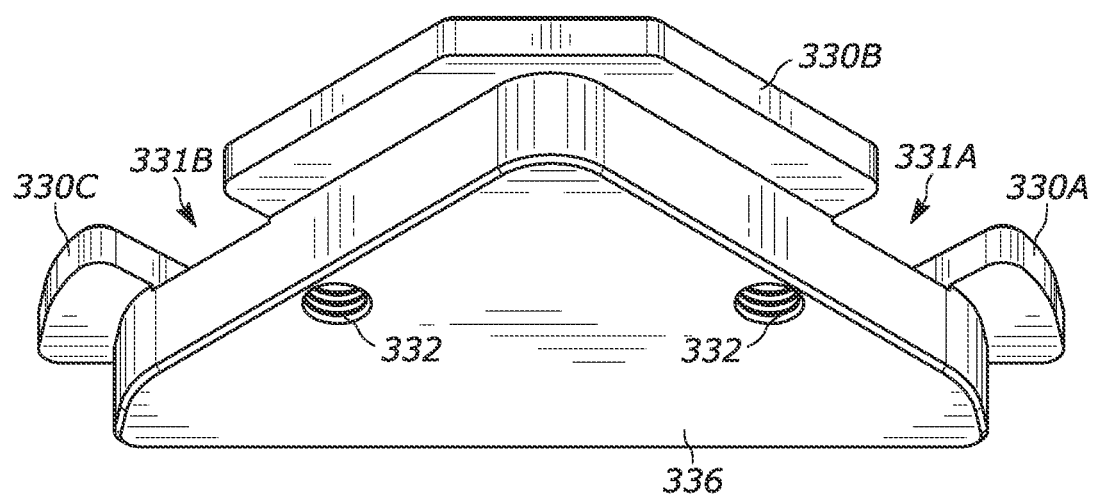
FIG. 27 is a bottom perspective view of the spacer and back plates of the dashboard mounting device shown in FIG. 22.

The back plate 330 of mounting device 310 includes a series of segments 330A, 330B, and 330C as illustrated in FIGS. 26 and 27. Each of these segments 330A-330C are integrally attached to the spacing flange 336. Channels 331A and 331B exist between the respective segments 330A-330C. Specifically, channel 331A exists between back plate segments 330A and 330B. Channel 331B exists between backplate segments 330B and 330C. As discussed above, the channels 331A, 331B provide space such that louvers (e.g., louvers 356A, 356B shown in FIGS. 28-29) have freedom to pivot within the channels 331A, 331B. The back plate segments 330A-330C are sized to minimize or eliminate obstructing movement of the louvers. The back plate segments 330A-330C may be customized to optimize how they fit with air vents in certain models of vehicles. As shown in FIG. 26, the mounting device 310 includes somewhat triangular back plate segments 330A and 330C, and the segment 330B includes a notched corner to avoid interfering with a particular air vent. Relative to back plate segment 130B, discussed above, the back plate segment 330B is larger and takes up a greater fraction of the back plate. The advantages and reasons for customizing back plate segments 330A-330C are the same as those discussed above for mounting device 110. When installed on an air vent, a louver is present in the channel 331A or 331B on only one side 325 of the mounting device 310. For example, depending on the orientation of the mounting device relative to the air vent, only channel 331A might receive a louver. In another orientation, only channel 331B might receive a louver. This allows use of the mounting device 310 on mirror image air vents (e.g., passenger's side versus driver's side of a vehicle) or on different corners within a substantially square or rectangular air vent.

Figure 29:
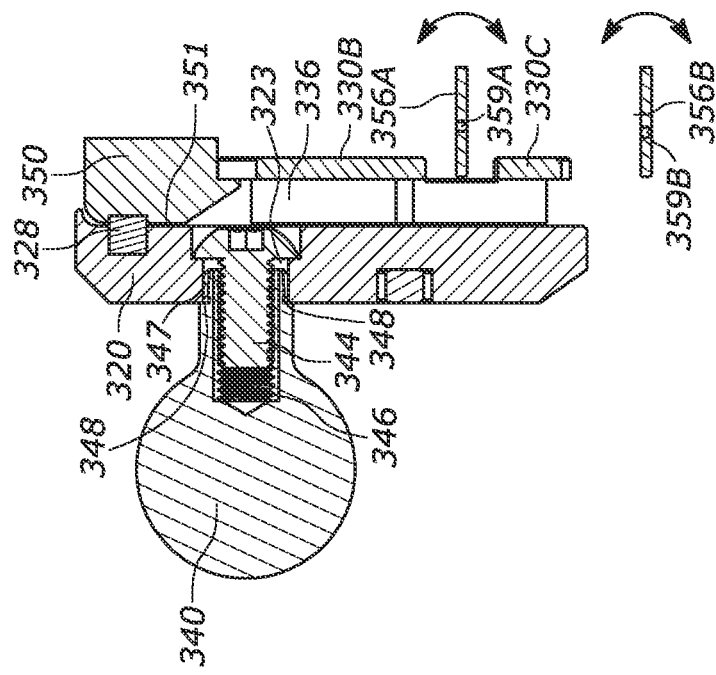
FIG. 29 is a cut-away view of the dashboard mounting device shown in FIG. 22 in the context of an air vent.
Figure 28:
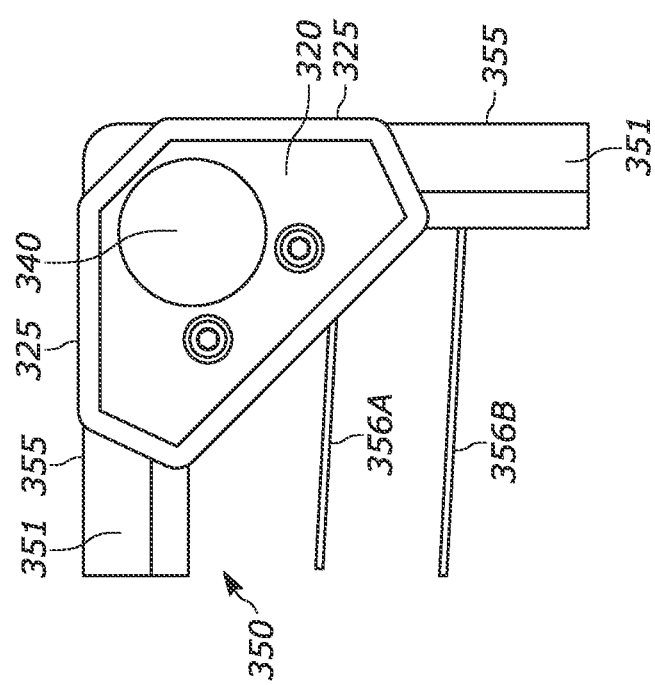
FIG. 28 is a front elevation view of the dashboard mounting device shown in FIG. 22 in the context of an air vent.

With reference to FIGS. 28 and 29, the mounting device 310 is installed on the air vent 350 such that the mounting device 310 does not obstruct the louvers 356A, 356B associated with the air vent 350. The mounting device 310 can be installed by opening the louvers 356A, 356B and then sliding the mounting device 310 along the top-most louver 356A. The mounting device 310 can then be placed onto the frame 355 such that the back plate 330 extends behind the frame 355. The mounting device 310 shown in FIGS. 22-29 is designed to fit in a corner of the frame 355. FIGS. 28 and 29 show only a portion of the frame 355 and only a portion of the corresponding parts of an air vent. To secure the mounting device 310 to the frame 355, the screws 324 are tightened, which compresses the elastomeric compression strip 328 against the front surface 351 of the frame 355.

FIG. 29 provides a cross-sectional view of the mounting device 310, installed on the frame 355 of the air vent. The frame 355 is captured between the front plate 320 and the back plate 330. The elastomeric compression strip 328 provides a resilient element that maintains force against the frame and provides a high friction element to hold the mounting device 310 rigidly in place. The shape of the mounting device 310 provides free movement for the louvers 356A, 356B on the air vent. Each of the louvers pivots about a pivot point 359A, 359B, allowing motion illustrated by the arrows.

In the example illustrated in FIG. 29, the ball coupler 340 is attached to the front plate 320 using threaded fastener 344. In preferred embodiments a pocket 323 is provided in the front plate 320, to receive a knurled portion 347 of the ball coupler 340. A shoulder 348 is adjacent to the knurled portion 347, such that when the threaded fastener 344 draws the knurled portion 347 into the pocket 323 the shoulder 348 provides support for the ball coupler 340 against a front surface of the front plate 320. The threaded fastener 344 screws into a blind threaded hole 346 that is substantially concentric within the neck 342 of the ball coupler 340. Although other configurations could be used, this example is preferred because it holds the ball coupler 340 rigidly in place such that it will not rotate relative to the mounting device during use.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A removable mounting device configured for mounting accessories to an air vent in a vehicle, comprising:
    a front plate configured to overlay a portion of a frame surrounding the air vent in the vehicle;
    a back plate removably fastened to the front plate, wherein at least one portion of the back plate and the front plate are configured to clamp the frame of the air vent from opposing sides of the frame while allowing louvers of the air vent to be moveable within the air vent;
    a spacing flange between the front plate and the at least one portion of the back plate;
    a coupler affixed to the front plate;
    a groove formed in a back side of the front plate, configured to substantially match a profile of the frame;
    an elastomeric compression strip installed in the groove, wherein the elastomeric compression strip has a nonuniform stiffness including a first stiffness in a region of the groove not adjacent to an end of the groove and a second stiffness greater than the first stiffness in a region of the groove adjacent to the end of the groove.

2. The removable mounting device of claim 1, further wherein an uncompressed length of the elastomeric compression strip is greater than a length of the groove.

3. The removable mounting device of claim 1, further comprising:
a threaded fastener securing the coupler to the front plate;
wherein the coupler further comprises:
a substantially spherical portion;
a shaft extending from the spherical portion;
a knurled portion at a distal end of the shaft;
a threaded hole in the distal end of the shaft receiving the threaded fastener;
wherein the front plate further comprises:
a pocket disposed on a front side of the front plate for receiving the knurled portion at the distal end of the shaft.

4. The removable mounting device of claim 1, further comprising a lip extending from a back side of the front plate and disposed along an edge of the front plate.

5. The removable mounting device of claim 1, further comprising:
at least two screws;
wherein the back plate fastens to the front plate using the at least two screws.

6. The removable mounting device of claim 5, wherein:
the at least two screws are disposed on a first axis that substantially bisects the back plate in a direction perpendicular to the first axis;
the coupler is disposed on a second axis that substantially bisects the front plate in a direction perpendicular to the first axis; and
the at least two screws and the coupler are symmetric with respect to the front plate in the direction perpendicular to the first axis.

7. The removable mounting device of claim 1, further comprising:
at least one channel between segments of the back plate, wherein the at least one channel permits the louvers to move when the mounting device is attached to the air vent.

8. The removable mounting device of claim 1, further comprising:
a plurality of threaded fasteners disposed in holes in the front plate and configured to removably fasten the back plate to the front plate with the frame clamped therebetween.

9. The removable mounting device of claim 1, wherein the spacing flange is integrated with and extending rearwardly from the front plate.

10. The removable mounting device of claim 1, wherein the spacing flange is integrated with and extending forwardly from the at least one portion of the back plate.

11. The removable mounting device of claim 1, wherein the coupler is a ball coupler or a socket coupler.

12. A method of mounting a removable mounting device on a frame of an air vent in a vehicle, wherein the mounting device comprises a front plate configured to overlay the frame, and a back plate configured to clamp the frame to the front plate; the method comprising steps of:

loosening a plurality of threaded fasteners used to fasten the front plate to the back plate such that a gap between the front plate and the back plate is sufficient to receive the frame;
placing the mounting device on the frame such that the frame is disposed between the front plate and the back plate;
tightening the plurality of threaded fasteners such that the frame is clamped between the front plate and the back plate and a clamping force is developed by compressing an elastomeric compression strip installed in a groove formed in a back side of the front plate, wherein the groove is configured to substantially match a profile of the frame, and wherein an uncompressed length of the elastomeric compression strip is greater than a length of the groove,
wherein the elastomeric compression strip has a non-uniform stiffness including a first stiffness in a region of the groove not adjacent to an end of the groove and a second stiffness greater than the first stiffness in a region of the groove adjacent to the end of the groove.

13. The method of claim 12, further comprising the step of orienting the frame of the air vent at a desired orientation before tightening the plurality of threaded fasteners.

14. The removable mounting device of claim 1 wherein the non-uniform stiffness of the elastomeric compression strip is caused by a variation in a thickness of the elastomeric compression strip along at least a portion of the length of the elastomeric compression strip.

15. The removable mounting device of claim 14 wherein the elastomeric compression strip has a first thickness in the region of the groove not adjacent to the end of the groove and a second thickness greater than the first thickness in the region of the groove adjacent to the end of the groove.

16. The removable mounting device of claim 1 wherein an end portion of the elastomeric compression strip has an increased width relative to a central portion of the elastomeric compression strip to provide the non-uniform stiffness of the elastomeric compression strip.

17. The removable mounting device of claim 1 wherein a portion of the elastomeric compression strip at the region of the groove adjacent the end of the groove comprises a stiffer material than a portion of the elastomeric compression strip at the region of the groove not adjacent to the end of the groove.

18. The removable mounting device of claim 1 wherein an uncompressed length of the elastomeric compression strip is greater than a length of the groove, and wherein the non-uniform stiffness of the elastomeric compression strip is caused by compressing an excess length of the elastomeric compression strip in the region of the groove adjacent the end of the groove.

19. The method of claim 12 wherein the non-uniform stiffness of the elastomeric compression strip is caused by compressing an excess length of the elastomeric compression strip in the region of the groove adjacent the end of the groove.

20. The method of claim 12 wherein the non-uniform stiffness of the elastomeric compression strip is caused by a variation in a thickness of the elastomeric compression strip along at least a portion of the length of the elastomeric compression strip.

* * * * *